(12) United States Patent
Wang et al.

(10) Patent No.: US 12,127,048 B2
(45) Date of Patent: Oct. 22, 2024

(54) COMMUNICATION METHOD AND COMMUNICATIONS APPARATUS AND SYSTEM

(71) Applicant: HUAWEI TECHNOLOGIES CO., LTD., Guangdong (CN)

(72) Inventors: Rui Wang, Shanghai (CN); Mingzeng Dai, Shenzhen (CN); Wenjie Peng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/170,768

(22) Filed: Feb. 17, 2023

(65) Prior Publication Data
US 2023/0276312 A1 Aug. 31, 2023

Related U.S. Application Data

(63) Continuation of application No. 17/104,754, filed on Nov. 25, 2020, now Pat. No. 11,606,731, which is a
(Continued)

(30) Foreign Application Priority Data

May 30, 2018 (CN) .......................... 201810542802.3

(51) Int. Cl.
*H04W 36/00* (2009.01)
*H04W 12/041* (2021.01)
(Continued)

(52) U.S. Cl.
CPC ..... *H04W 36/0038* (2013.01); *H04W 12/041* (2021.01); *H04W 36/0072* (2013.01); *H04W 74/0833* (2013.01); *H04W 76/27* (2018.02)

(58) Field of Classification Search
CPC .......... H04W 36/0038; H04W 12/041; H04W 36/0072; H04W 74/0833; H04W 76/27;
(Continued)

(56) References Cited

U.S. PATENT DOCUMENTS

2015/0029918 A1 1/2015 Bangolae et al.
2017/0019945 A1 1/2017 Chiba et al.
(Continued)

FOREIGN PATENT DOCUMENTS

CN 102215485 A 10/2011
CN 103581899 A 2/2014
(Continued)

OTHER PUBLICATIONS

Intel, Stage 3 RRC TP on RRC_INACTIVE state for E-UTRA connected to 5GC, 3GPP TSG-RAN2 Meeting #102, Busan, Korea, May 21-25, 2018, R2-1807362, 63 pages.
(Continued)

*Primary Examiner* — Mazda Sabouri
(74) *Attorney, Agent, or Firm* — WOMBLE BOND DICKINSON (US) LLP

(57) ABSTRACT

This application discloses a communication method, a communications apparatus and a communications system, to resolve a problem that a terminal cannot quickly resume a communication connection to a secondary node. The method includes: sending a first message to a first master node to request state transition of a terminal from a third mode to a connected mode; receiving a second message from the first master node, where the second message comprises a first security parameter and SCG configuration information, and completing, based on the first security parameter and the SCG configuration information, a communication connection to the secondary node.

20 Claims, 13 Drawing Sheets

Related U.S. Application Data continuation of application No. PCT/CN2019/087210, filed on May 16, 2019.

(51) Int. Cl.
*H04W 74/0833* (2024.01)
*H04W 76/27* (2018.01)

(58) Field of Classification Search
CPC . H04W 76/16; H04W 36/0069; H04W 84/20; H04W 76/19; H04W 12/30; H04W 12/06; H04W 12/106
See application file for complete search history.

(56) References Cited

U.S. PATENT DOCUMENTS

| | | |
|---|---|---|
| 2018/0092156 A1 | 3/2018 | Kim et al. |
| 2020/0120552 A1 | 4/2020 | Yang et al. |
| 2020/0396675 A1 | 12/2020 | Liu et al. |

FOREIGN PATENT DOCUMENTS

| | | |
|---|---|---|
| CN | 104521313 A | 4/2015 |
| CN | 104936163 A | 9/2015 |
| CN | 105992292 A | 10/2016 |
| CN | 106792928 A | 5/2017 |
| CN | 106793169 A | 5/2017 |
| CN | 107295579 A | 10/2017 |
| CN | 107666692 A | 2/2018 |
| CN | 107734569 A | 2/2018 |
| CN | 105027495 B | 12/2018 |
| CN | 106063328 B | 2/2020 |
| EP | 3099029 A1 | 11/2016 |
| EP | 3742815 A1 | 11/2020 |
| WO | 2013097672 A1 | 7/2013 |
| WO | 2015139763 A1 | 9/2015 |
| WO | 2016114623 A1 | 7/2016 |
| WO | 2016190639 A1 | 12/2016 |
| WO | 2018059147 A1 | 4/2018 |
| WO | 2018059170 A1 | 4/2018 |

OTHER PUBLICATIONS

Characteristics template for NR RIT of 5G (Release 15 and beyond), 3GPP, Jan. 22, 2018, 27 pages.

3GPP TS 33.501 V15.0.0 (Mar. 2018), 3rd Generation Partnership Project; Technical Specification Group Services and System Aspects; Security architecture and procedures for 5G system(Release 15), total 128 pages.

Samsung et al: "Harmonised two step reconnection (re establishment and resume)", 3GPP Draft; R2-1807834 , May 20, 2018, XP051444170, total43 pages.

Ericsson: "Security for RRC Connection Suspend and Resume", 3GPP Draft; S3-160588, May 8, 2016, XP051099204, total 3 pages.

Ericsson: "RRC suspend/resume in MR-DC", 3GPP Draft; R2-1708024, Aug. 20, 2017, XP051317936, total 4 pages.

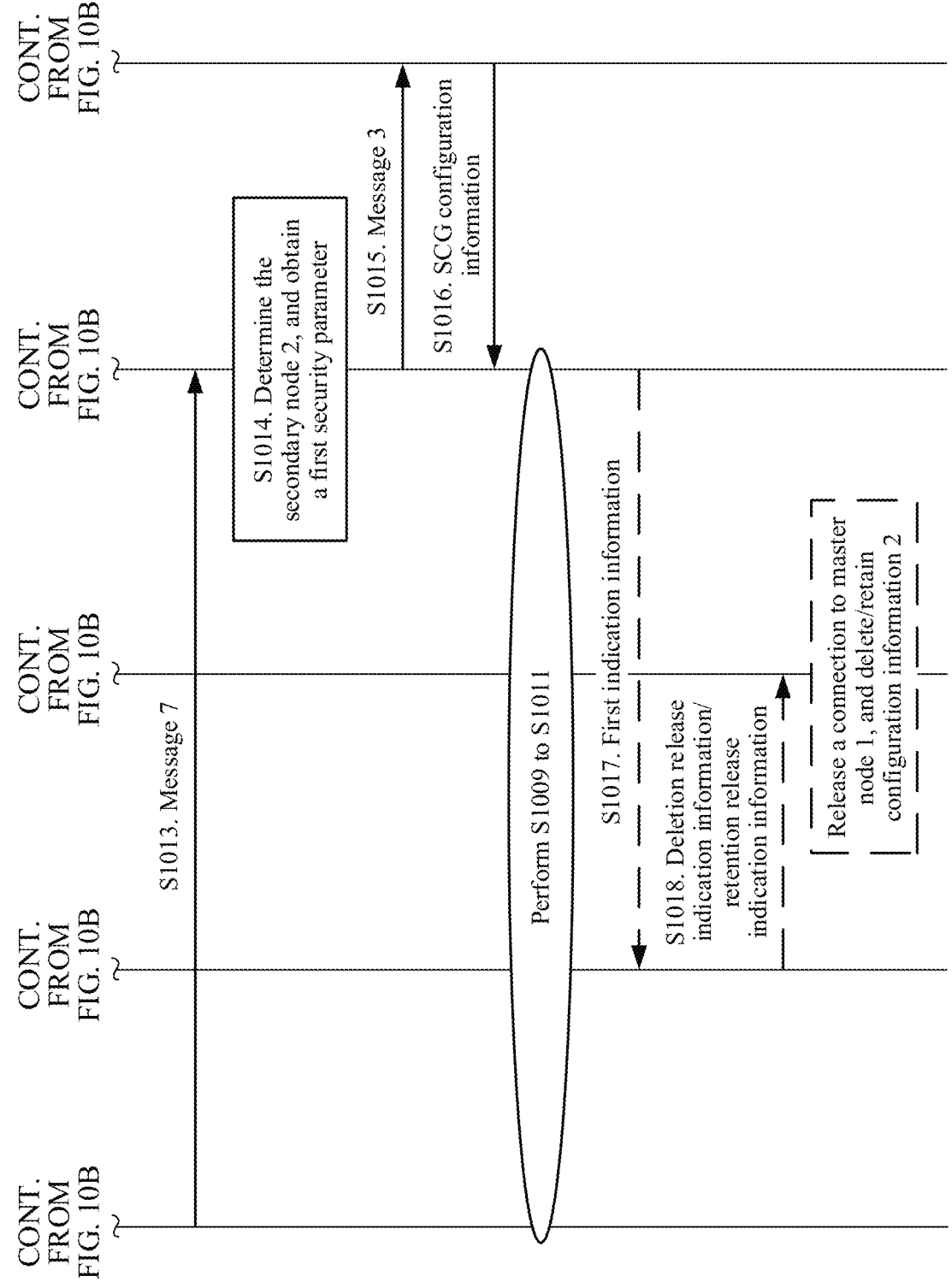

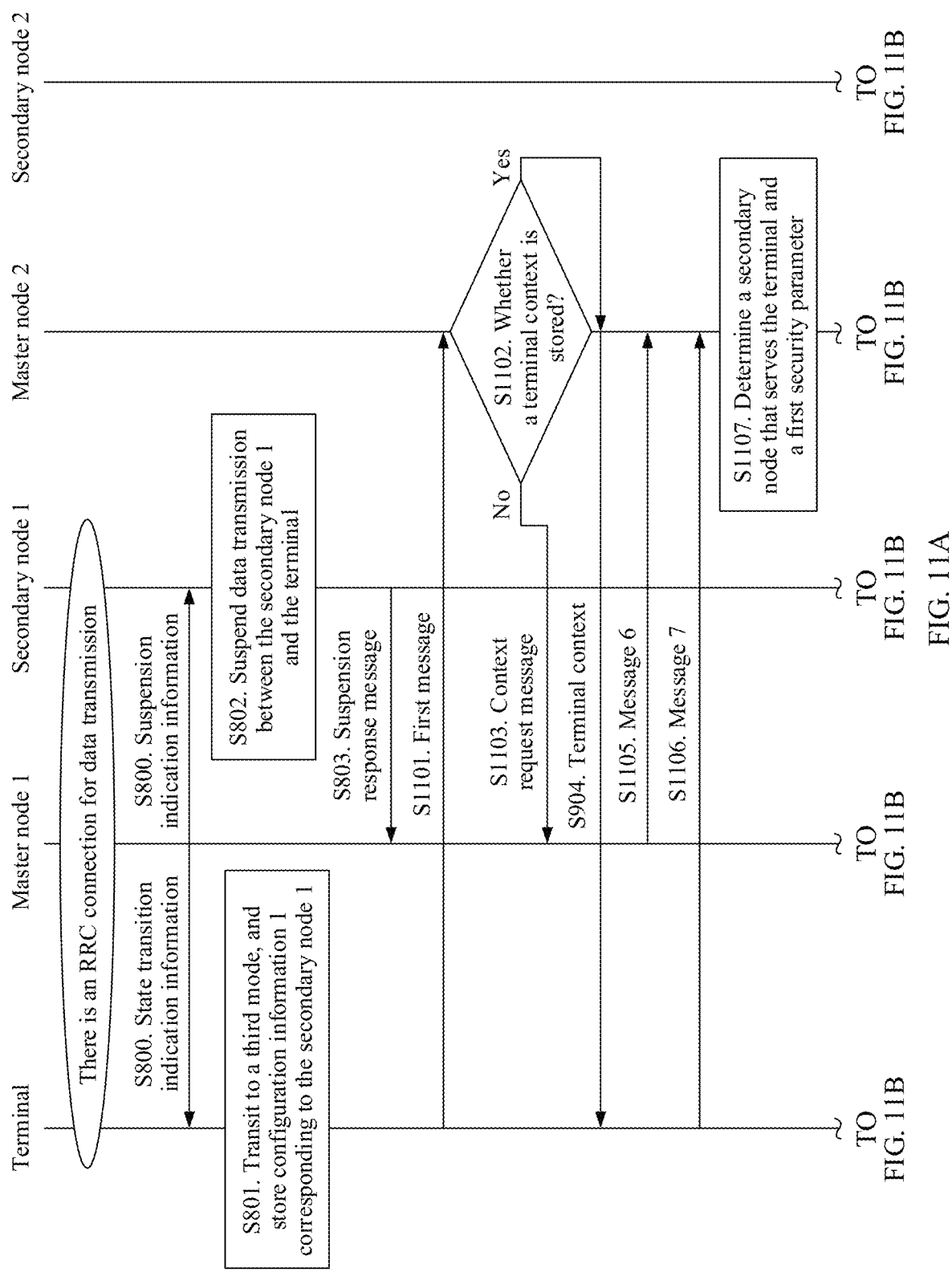

COMMUNICATION METHOD AND COMMUNICATIONS APPARATUS AND SYSTEM

CROSS-REFERENCE TO RELATED APPLICATIONS

This application is a continuation of U.S. patent application Ser. No. 17/104,754, filed on Nov. 25, 2020, which is a continuation of International Application No. PCT/CN2019/087210, filed on May 16, 2019, The International Application claims priority to Chinese Patent Application No. 201810542802.3, filed on May 30, 2018. All of the aforementioned patent applications are hereby incorporated by reference in their entireties.

TECHNICAL FIELD

Embodiments of this application relate to the field of communications technologies, and in particular, to a communication method and a communications apparatus and system.

BACKGROUND

User equipment (UE) in a 5th generation communications technology (5G) system, referred to as 5G UE for short, may be in a radio resource control (RRC) idle mode, an RRC connected mode, or a third mode. The third mode may also be referred to as an inactive mode (RRC Inactive mode). In a scenario in which the 5G UE is in the third mode, both the 5G UE and an access network (RAN) device store an AS context of the 5G UE, a core network device stores a context of the 5G UE, and there is a dedicated signaling connection (UE associated NG connection), to the 5G UE, between the core network device and the RAN device. There is no RRC connection between the 5G UE and the RAN device. In the third mode, because the dedicated connection, to the 5G UE, between the core network device and the RAN device is not released, when the RAN device stores the AS context of the 5G UE, the 5G UE can accelerate resumption to the connected mode, and quickly perform data transmission.

The 5G system includes a heterogeneous communications system in which a gNB (a base station using a new radio (NR) technology in the 5G system) and an ng-eNB connected to a next-generation core network (NGC) perform collaborative networking. Currently, in the heterogeneous communications system, when the 5G UE resumes from the third mode to the connected mode, a master node configures a new secondary node for the 5G UE. In other words, the master node needs to reconfigure a secondary cell group (SCG). However, because a procedure of reconfiguring a secondary node for the terminal by the master node is relatively long, the 5G UE resumes a communication connection to the secondary node at a relatively low rate.

SUMMARY

Embodiments of this application provide a communication method and a communications apparatus and system, to resolve a problem that a communication connection to a secondary node is resumed at a relatively low rate when a terminal resumes from a third mode to a connected mode.

To achieve the foregoing objective, the following technical solutions are used in the embodiments of this application.

According to a first aspect, a communication method is provided. After receiving a first message sent by a terminal for requesting the terminal to transition from a third mode to a connected mode, a first master node determines a secondary node that serves the terminal, and obtains a first security parameter and SCG configuration information. The first security parameter is used to derive a security key used for communication between the terminal and the secondary node that serves the terminal. The SCG configuration information includes at least one of a random access resource allocated to the terminal by the secondary node that serves the terminal, information about a serving cell set of the secondary node that serves the terminal, and indication information of a master cell of the secondary node that serves the terminal. Then, the first master node sends a second message including the first security parameter and the SCG configuration information to the terminal.

The first security parameter and SCG configuration information are necessarily required for the communication between the terminal and the secondary node that serves the terminal. Therefore, after the first master node sends both the first security parameter and the SCG configuration information to the terminal, the terminal may directly complete, based on the first security parameter and the SCG configuration information, the communication connection to the secondary node that serves the terminal. This effectively improves a rate of configuring an SCG when the terminal resumes from the third mode to the connected mode, and further improves efficiency of transmitting data by the terminal through an air interface of the secondary node.

In an embodiment, a method for "determining, by the first master node, a secondary node that serves the terminal" is: receiving, by the first master node, first information that is sent by the terminal and that is used by the first master node to determine the secondary node that serves the terminal. In this way, the first master node determines, based on the first information, the secondary node that serves the terminal. Herein, the first information includes channel quality of each of at least one measurement cell, the first information is used to indicate that the secondary node that serves the terminal is a first secondary node, the first information is used to indicate that the secondary node that serves the terminal is a first secondary node and indicate a cell that is of the first secondary node and that satisfies a preset condition, the first information is used to indicate that the secondary node that serves the terminal is a second secondary node, the first information is used to indicate that the secondary node that serves the terminal is not a first secondary node and indicate an identifier of a second secondary node, or the first information is used to indicate that the secondary node that serves the terminal is not a first secondary node and indicate channel quality of each of at least one measurement cell. In this application, the first secondary node serves the terminal before the terminal transitions to the third mode.

In an embodiment, the first information is carried in the first message, and the first message is specifically used to request to resume a radio link control RRC connection of the terminal or used to request to update a location area of a terminal. The second message is used to resume the RRC connection between the first master node and the terminal.

In an embodiment, in this application, the first information may be all carried in the first message. Alternatively, a part of the first information may be carried in the first message, and the other part may be carried in a message 7 (where the message 7 is sent by the terminal to the first master node after the terminal receives the second message). Alternatively, the first information may be all carried in a message 7. This is not specifically limited in this application. For a detailed description of the message 7, refer to the following content.

In an embodiment, the secondary node that serves the terminal is a first secondary node, and the first secondary node serves the terminal before the terminal transitions to the third mode, and a method for "obtaining, by the first master node, SCG configuration information" is: obtaining, by the first master node, a context of the terminal, where the context of the terminal includes a first terminal identifier, the first terminal identifier is allocated to the terminal by the first secondary node on an interface between the first secondary node and a second master node, and the second master node serves the terminal before the terminal transitions to the third mode; sending, by the first master node, a third message including the first terminal identifier to the first secondary node, where the third message is used to request the first secondary node to allocate the SCG configuration information; and receiving, by the first master node, the SCG configuration information from the first secondary node.

Because the first secondary node serves the terminal before the terminal transitions to the third mode, the first secondary node can determine the terminal based on the first terminal identifier and allocate the SCG configuration to the terminal.

In an embodiment, the secondary node that serves the terminal is a second secondary node, and a method for "obtaining, by the first master node, SCG configuration information" is: obtaining, by the first master node, a context of the terminal, where the context of the terminal includes first configuration information, the first configuration information is the SCG configuration information allocated by the first secondary node, and the first secondary node serves the terminal before the terminal transitions to the third mode; sending, by the first master node, a third message including the first configuration information to the second secondary node, where the third message is used to request the second secondary node to allocate the SCG configuration information; and receiving, by the first master node, the SCG configuration information from the second secondary node.

If the secondary node that serves the terminal is the second secondary node, the first master node needs to send the first configuration information to the second secondary node, so that the second secondary node allocates the SCG configuration to the terminal based on the first configuration information.

In an embodiment, the communication method provided by this application further includes: sending, by the first master node, first indication information to the second master node, where the first indication information is used to indicate that the secondary node that serves the terminal is the first secondary node, or the first indication information is used to indicate that the secondary node that serves the terminal is not the first secondary node; the second master node serves the terminal before the terminal transitions to the third mode; and the first secondary node serves the terminal before the terminal transitions to the third mode.

The first master node sends the first indication information to the second master node, so that the second master node can communicate with the first secondary node based on the first indication information. In addition, the second master node may further determine, based on the first indication information, whether to send the first terminal identifier to the first master node.

According to a second aspect, a communications apparatus is provided. The communications apparatus can implement functions in any one of the first aspect or the possible implementations thereof. The functions may be implemented by hardware, or may be implemented by hardware executing corresponding software. The hardware or software includes one or more modules corresponding to the foregoing functions.

In an embodiment, the communications apparatus may include a receiving unit, a processing unit, and a sending unit. The receiving unit, the processing unit, and the sending unit may perform corresponding functions in the communication method according to any one of the first aspect or the possible implementations thereof. For example, the receiving unit is configured to receive a first message from a terminal, where the first message is used to request state transition of the terminal from a third mode to a connected mode. The processing unit is configured to: determine a secondary node that serves the terminal; obtain a first security parameter, where the first security parameter is used to derive a security key used for communication between the terminal and the secondary node that serves the terminal; and obtain SCG configuration information, where the SCG configuration information includes at least one of a random access resource allocated to the terminal by the secondary node that serves the terminal, information about a serving cell set of the secondary node that serves the terminal, and indication information of a master cell of the secondary node that serves the terminal. The sending unit is configured to send a second message to the terminal, where the second message includes the first security parameter and the SCG configuration information that are obtained by the processing unit.

According to a third aspect, a communications apparatus is provided. The communications apparatus includes a processor. The processor is configured to: couple to a memory, and read and execute an instruction in the memory, to implement the communication method according to any one of the first aspect or the possible implementations thereof.

In an embodiment, the communications apparatus may further include the memory, and the memory is configured to store a program instruction and data of the communications apparatus. Further, optionally, the communications apparatus may further include a transceiver. Under control of the processor of the communications apparatus, the transceiver is configured to perform operations of sending and receiving data, signaling, or information in the communication method according to any one of the first aspect or the possible implementations thereof, for example, receiving a first message or sending a second message.

In an embodiment, the communications apparatus may be a first master node, or may be a part of a first master node, for example, a chip system in the first master node. The chip system is configured to support the first master node in implementing a function described in any one of the first aspect or the possible implementations thereof, for example, receiving, sending, or processing data and/or information used in the foregoing communication method. The chip system includes a chip, and may further include another discrete device or circuit structure.

According to a fourth aspect, a computer-readable storage medium is further provided. The computer-readable storage medium stores an instruction. When the instruction is run on a communications apparatus, the communications apparatus is enabled to perform the communication method according to any one of the first aspect or the possible implementations thereof.

According to a fifth aspect, a computer program product including an instruction is further provided. When the instruction is run on a communications apparatus, the communications apparatus is enabled to perform the communication method according to any one of the first aspect or the possible implementations thereof.

It should be noted that the instruction may be all or partially stored in a first computer storage medium. The first computer storage medium may be packaged together with a processor, or the first computer storage medium and a processor may be separately packaged. This is not specifically limited in this application.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the implementations of the first aspect. In addition, for beneficial effects of the second aspect, the third aspect, the fourth aspect, the fifth aspect, and the various implementations of the second aspect, the third aspect, the fourth aspect, and the fifth aspect, refer to analyses of the beneficial effects of the first aspect and the implementations of the first aspect. Details are not described herein again.

According to a sixth aspect, a communication method is provided. After determining that a radio resource control RRC state of a terminal is to be transitioned from a connected mode to a third mode, a second master node sends suspension indication information to a first secondary node, where the suspension indication information is used to suspend data transmission between the first secondary node and the terminal. Correspondingly, the second master node receives first configuration information from the first secondary node, and stores the first configuration information, where the first configuration information includes at least one of a random access resource allocated to the terminal by the first secondary node, configuration information of a secondary cell group SCG bearer, and a PDCP state of an SCG bearer (or referred to as an SN bearer). Subsequently, the second master node receives a context request message from a first master node, where the context request message is used to request a context of the terminal, the first master node is an access network device to which a first cell belongs, and the first cell is a cell in which the RRC state of the terminal is the third mode and the terminal requests to resume an RRC connection. The second master node sends the context of the terminal to the first master node in response to the context request message, where the context of the terminal includes at least one of the first configuration information and a first terminal identifier of the terminal; and the first terminal identifier is allocated to the terminal by the first secondary node on an interface between the first secondary node and the second master node.

In an embodiment, the communication method provided by this application further includes: determining, by the second master node, a secondary node that serves the terminal; and when the secondary node that serves the terminal is not the first secondary node, sending, by the second master node, deletion release indication information to the first secondary node, where the deletion release indication information is used to delete the first configuration information that is in the first secondary node and release a dedicated resource that is of the terminal and that is on the interface between the first secondary node and the second master node; or when the secondary node that serves the terminal is the first secondary node, sending, by the second master node, retention release indication information to the first secondary node, where the retention release indication information is used to retain the first configuration information that is in the first secondary node and release a dedicated resource that is of the terminal and that is on the interface between the first secondary node and the second master node.

When the terminal resumes from the third mode to the connected mode, the terminal reselects the first master node. Therefore, the dedicated resource that is of the terminal and that is between the second master node and the first secondary node needs to be released, to reduce a resource waste and improve effective resource utilization. In addition, the second master node determines, depending on whether the secondary node that serves the terminal is the first secondary node, whether the first secondary node needs to retain the first configuration information.

In an embodiment, a method for "determining, by the second master node, a secondary node that serves the terminal" is: receiving, by the second master node, first indication information from the first master node; and determining, by the second master node based on the first indication information, the secondary node that serves the terminal, where the first indication information is used to indicate that the secondary node that serves the terminal is the first secondary node, or the first indication information is used to indicate that the secondary node that serves the terminal is not the first secondary node.

With reference to the communication method in the first aspect, it can be learned that in this application, the first master node determines the secondary node that serves the terminal. In this way, the first master node may send the first indication information to the second master node, so that the second master node determines to communicate with the first secondary node subsequently.

According to a seventh aspect, a communications apparatus is provided. The communications apparatus can implement functions in any one of the sixth aspect or the possible implementations thereof. The functions may be implemented by hardware, or may be implemented by hardware executing corresponding software. The hardware or software includes one or more modules corresponding to the foregoing functions.

In an embodiment, the communications apparatus may include a processing unit, a receiving unit, and a sending unit. The processing unit, the receiving unit, and the sending unit may perform corresponding functions in the communication method according to any one of the sixth aspect or the possible implementations thereof. For example, the processing unit is configured to determine that a radio resource control RRC state of a terminal is to be transitioned from a connected mode to a third mode. The receiving unit is configured to: receive first configuration information from a first secondary node, and store the first configuration information, where the first configuration information includes at least one of a random access resource allocated to the terminal by the first secondary node, configuration information of a secondary cell group SCG bearer, and a PDCP state of an SCG bearer (or referred to as an SN bearer); and receive a context request message from a first master node, where the context request message is used to request a context of the terminal, the first master node is an access network device to which a first cell belongs, and the first cell is a cell in which the RRC state of the terminal is the third mode and the terminal requests to resume an RRC connection. The sending unit is configured to: send suspension indication information to the first secondary node, where the suspension indication information is used to suspend data transmission between the first secondary node and the terminal; and send the context of the terminal to the first master node in response to the context request message, where the context of the terminal includes at least one of the first configuration information and a first terminal identifier of the terminal; and the first terminal identifier is allocated to the terminal by the first secondary node on an interface between the first secondary node and the second master node.

According to an eighth aspect, a communications apparatus is provided. The communications apparatus includes a processor. The processor is configured to: couple to a memory, and read and execute an instruction in the memory, to implement the communication method according to any one of the sixth aspect or the possible implementations thereof.

In an embodiment, the communications apparatus may further include the memory, and the memory is configured to store a program instruction and data of the communications apparatus. Further, optionally, the communications apparatus may further include a transceiver. Under control of the processor of the communications apparatus, the transceiver is configured to perform operations of sending and receiving data, signaling, or information in the communication method according to any one of the sixth aspect or the possible implementations thereof, for example, sending suspension indication information, receiving first configuration information, or receiving a context request message.

In an embodiment, the communications apparatus may be a second master node, or may be a part of a second master node, for example, a chip system in the second master node. The chip system is configured to support the second master node in implementing a function described in any one of the sixth aspect or the possible implementations thereof, for example, receiving, sending, or processing data and/or information used in the foregoing communication method. The chip system includes a chip, and may further include another discrete device or circuit structure.

According to a ninth aspect, a computer-readable storage medium is further provided. The computer-readable storage medium stores an instruction. When the instruction is run on a communications apparatus, the communications apparatus is enabled to perform the communication method according to any one of the sixth aspect or the possible implementations thereof.

According to a tenth aspect, a computer program product including an instruction is further provided. When the instruction is run on a communications apparatus, the communications apparatus is enabled to perform the communication method according to any one of the sixth aspect or the possible implementations thereof.

It should be noted that the instruction may be all or partially stored in a first computer storage medium. The first computer storage medium may be packaged together with a processor, or the first computer storage medium and a processor may be separately packaged. This is not specifically limited in this application.

In this application, for detailed descriptions of the seventh aspect, the eighth aspect, the ninth aspect, the tenth aspect, and various implementations of the seventh aspect, the eighth aspect, the ninth aspect, and the tenth aspect, refer to detailed descriptions of the sixth aspect and the implementations of the sixth aspect. In addition, for beneficial effects of the seventh aspect, the eighth aspect, the ninth aspect, the tenth aspect, and the various implementations of the seventh aspect, the eighth aspect, the ninth aspect, and the tenth aspect, refer to analyses of the beneficial effects of the sixth aspect and the implementations of the sixth aspect. Details are not described herein again.

According to an eleventh aspect, a communication method is provided. A first secondary node receives suspension indication information from a second master node, where the suspension indication information is used to suspend data transmission between the first secondary node and a terminal. The first secondary node suspends the data transmission between the first secondary node and the terminal based on the suspension indication information; and sends a suspension response message including first configuration information to the second master node, where the suspension response message is used to indicate that the data transmission between the first secondary node and the terminal has been suspended, and the first configuration information includes at least one of a random access resource allocated to the terminal by the first secondary node, configuration information of a secondary cell group SCG bearer, and a PDCP state of an SCG bearer (or referred to as an SN bearer).

After receiving the suspension indication information, the first secondary node suspends the data transmission between the first secondary node and the terminal, and neither interrupts a connection between the first secondary node and the terminal nor releases the dedicated resource allocated to the terminal by the first secondary node. In this way, when the terminal resumes from the third mode to the connected mode subsequently, if the secondary node that serves the terminal is still the first secondary node, the terminal can directly perform communication through the connection between the first secondary node and the terminal, thereby improving efficiency of data transmission performed by the terminal through an air interface of the secondary node.

In an embodiment, the communication method provided by this application further includes: receiving, by the first secondary node, deletion release indication information from the second master node, where the deletion release indication information is used to delete the first configuration information that is in the first secondary node and release a dedicated resource that is of the terminal and that is on an interface between the first secondary node and the second master node; or receiving, by the first secondary node, retention release indication information from the second master node, where the retention release indication information is used to retain the first configuration information that is in the first secondary node and release a dedicated resource that is of the terminal and that is on an interface between the first secondary node and the second master node.

In an embodiment, when the first secondary node receives the retention release indication information from the second master node, the communication method provided by this application further includes: receiving, by the first secondary node, a first message including a first terminal identifier from a first master node; determining the terminal based on the first terminal identifier, and allocating SCG configuration information to the terminal; and sending, by the first secondary node, the SCG configuration information to the first master node. Herein, the first message is used to request a resource configuration from the first secondary node, the first master node is an access network device to which a first cell belongs, the first cell is a cell in which an RRC state of the terminal is a third mode and the terminal requests to resume an RRC connection, and the first terminal identifier is allocated to the terminal by the first secondary node on an interface between the first secondary node and the second master node. The SCG configuration information includes at least one of a random access resource allocated to the terminal by the first secondary node, information about a serving cell set of the first secondary node, and indication information of a master cell of the first secondary node.

According to a twelfth aspect, a communications apparatus is provided. The communications apparatus can implement functions in any one of the eleventh aspect or the possible implementations thereof. The functions may be implemented by hardware, or may be implemented by hardware executing corresponding software. The hardware or software includes one or more modules corresponding to the foregoing functions.

In an embodiment, the communications apparatus may include a processing unit, a receiving unit, and a sending unit. The processing unit, the receiving unit, and the sending unit may perform corresponding functions in the communication method according to any one of the eleventh aspect or the possible implementations thereof. For example, the receiving unit is configured to receive suspension indication information from a second master node, where the suspension indication information is used to suspend data transmission between the first secondary node and a terminal. The processing unit is configured to suspend the data transmission between the first secondary node and the terminal based on the suspension indication information. The sending unit is configured to send a suspension response message including first configuration information to the second master node, where the suspension response message is used to indicate that the data transmission between the first secondary node and the terminal has been suspended, and the first configuration information includes at least one of a random access resource allocated to the terminal by the first secondary node, configuration information of a secondary cell group SCG bearer, and a PDCP state of an SCG bearer (or referred to as an SN bearer).

According to a thirteenth aspect, a communications apparatus is provided. The communications apparatus includes a processor. The processor is configured to: couple to a memory, and read and execute an instruction in the memory, to implement the communication method according to any one of the eleventh aspect or the possible implementations thereof.

In an embodiment, the communications apparatus may further include the memory, and the memory is configured to store a program instruction and data of the communications apparatus. Further, optionally, the communications apparatus may further include a transceiver. Under control of the processor of the communications apparatus, the transceiver is configured to perform operations of sending and receiving data, signaling, or information in the communication method according to any one of the eleventh aspect or the possible implementations thereof, for example, receiving suspension indication information or sending a suspension response message.

In an embodiment, the communications apparatus may be a first secondary node, or may be a part of a first secondary node, for example, a chip system in the first secondary node. The chip system is configured to support the first secondary node in implementing a function described in any one of the eleventh aspect or the possible implementations thereof, for example, receiving, sending, or processing data and/or information used in the foregoing communication method. The chip system includes a chip, and may further include another discrete device or circuit structure.

According to a fourteenth aspect, a computer-readable storage medium is further provided. The computer-readable storage medium stores an instruction. When the instruction is run on a communications apparatus, the communications apparatus is enabled to perform the communication method according to any one of the eleventh aspect or the possible implementations thereof.

According to a fifteenth aspect, a computer program product including an instruction is further provided. When the instruction is run on a communications apparatus, the communications apparatus is enabled to perform the communication method according to any one of the eleventh aspect or the possible implementations thereof.

It should be noted that the instruction may be all or partially stored in a first computer storage medium. The first computer storage medium may be packaged together with a processor, or the first computer storage medium and a processor may be separately packaged. This is not specifically limited in this application.

In this application, for detailed descriptions of the twelfth aspect, the thirteenth aspect, the fourteenth aspect, the fifteenth aspect, and various implementations of the twelfth aspect, the thirteenth aspect, the fourteenth aspect, and the fifteenth aspect, refer to detailed descriptions of the eleventh aspect and the implementations of the eleventh aspect. In addition, for beneficial effects of the twelfth aspect, the thirteenth aspect, the fourteenth aspect, the fifteenth aspect, and the various implementations of the twelfth aspect, the thirteenth aspect, the fourteenth aspect, and the fifteenth aspect, refer to analyses of the beneficial effects of the eleventh aspect and the implementations of the eleventh aspect. Details are not described herein again.

According to a sixteenth aspect, a communication method is provided. A terminal sends a first message to a first master node, where the first message is used to request state transition of the terminal from a third mode to a connected mode, the first master node is an access network device to which a first cell belongs, and the first cell is a cell in which a radio resource control RRC state of the terminal is the third mode and the terminal requests to resume an RRC connection. Correspondingly, the terminal receives a second message from the first master node, where the second message includes a first security parameter and SCG configuration information. In this way, the terminal can complete, based on the first security parameter and the SCG configuration information, a communication connection to a secondary node that serves the terminal. Herein, the first security parameter is used to derive a security key used for communication between the terminal and the secondary node that serves the terminal, and the SCG configuration information includes at least one of a random access resource allocated to the terminal by the secondary node that serves the terminal, information about a serving cell set of the secondary node that serves the terminal, and indication information of a master cell of the secondary node that serves the terminal.

The first security parameter and SCG configuration information are necessarily required for the communication between the terminal and the secondary node that serves the terminal. Therefore, after the terminal receives both the first security parameter and the SCG configuration information that are sent, the terminal may directly complete, based on the first security parameter and the SCG configuration information, the communication connection to the secondary node that serves the terminal. This effectively improves a rate of configuring an SCG when the terminal resumes from the third mode to the connected mode, and further improves efficiency of transmitting data by the terminal through an air interface of the secondary node.

In an embodiment, the communication method provided by this application further includes: receiving, by the terminal, a state transition indication information from a second master node; and transitioning the RRC state of the terminal to the third mode in response to the state transition indication information, and storing first configuration information corresponding to a first secondary node. The state transition indication information is used to indicate the RRC state of the terminal to be transitioned from the connected mode to the third mode. The first configuration information includes at least one of configuration information of a secondary cell group SCG bearer and a PDCP state of an SCG bearer (or referred to as an SN bearer).

Compared with the prior art, in this application, after receiving the state transition indication information, the terminal does not delete the configuration information related to the first secondary node, but stores the first configuration information. In this way, when the terminal resumes from the third mode to the connected mode subsequently, if the secondary node that serves the terminal is still the first secondary node, the terminal may resume the connection to the first secondary node based on the first configuration information, thereby effectively improving efficiency of data transmission performed by the terminal through an air interface of the secondary node.

In an embodiment, the first message includes first information, and the first information is used by the first master node to determine the secondary node that serves the terminal; the first information includes channel quality of each of at least one measurement cell, the first information is used to indicate that the secondary node that serves the terminal is the first secondary node, the first information is used to indicate that the secondary node that serves the terminal is the first secondary node and indicate a cell that is of the first secondary node and that satisfies a preset condition, the first information is used to indicate that the secondary node that serves the terminal is a second secondary node, the first information is used to indicate that the secondary node that serves the terminal is not the first secondary node and indicate an identifier of a second secondary node, or the first information is used to indicate that the secondary node that serves the terminal is not the first secondary node and indicate channel quality of each of at least one measurement cell; and the first secondary node serves the terminal before the terminal transitions to the third mode.

According to a seventeenth aspect, a communications apparatus is provided. The communications apparatus can implement functions in any one of the sixteenth aspect or the possible implementations thereof. The functions may be implemented by hardware, or may be implemented by hardware executing corresponding software. The hardware or software includes one or more modules corresponding to the foregoing functions.

In an embodiment, the communications apparatus may include a processing unit, a receiving unit, and a sending unit. The processing unit, the receiving unit, and the sending unit may perform corresponding functions in the communication method according to any one of the sixteenth aspect or the possible implementations thereof. For example, the sending unit is configured to send a first message to a first master node, where the first message is used to request state transition of the terminal from a third mode to a connected mode, the first master node is an access network device to which a first cell belongs, and the first cell is a cell in which a radio resource control RRC state of the terminal is the third mode and the terminal requests to resume an RRC connection. The receiving unit is configured to receive a second message from the first master node, where the second message includes a first security parameter and SCG configuration information. The processing unit is configured to complete, based on the first security parameter and the SCG configuration information, a communication connection to a secondary node that serves the terminal. The first security parameter is used to derive a security key used for communication between the terminal and the secondary node that serves the terminal, and the SCG configuration information includes at least one of a random access resource allocated to the terminal by the secondary node that serves the terminal, information about a serving cell set of the secondary node that serves the terminal, and indication information of a master cell of the secondary node that serves the terminal.

According to an eighteenth aspect, a communications apparatus is provided. The communications apparatus includes a processor. The processor is configured to: couple to a memory, and read and execute an instruction in the memory, to implement the communication method according to any one of the sixteenth aspect or the possible implementations thereof.

In an embodiment, the communications apparatus may further include the memory, and the memory is configured to store a program instruction and data of the communications apparatus. Further, optionally, the communications apparatus further includes a transceiver. Under control of the processor of the communications apparatus, the transceiver is configured to perform operations of sending and receiving data, signaling, or information in the communication method according to any one of the sixteenth aspect or the possible implementations thereof, for example, sending a first message or receiving a second message.

In an embodiment, the communications apparatus may be a terminal, or may be a part of a terminal, for example, a chip system in the terminal. The chip system is configured to support the terminal in implementing a function described in any one of the sixteenth aspect or the possible implementations thereof, for example, receiving, sending, or processing data and/or information used in the foregoing communication method. The chip system includes a chip, and may further include another discrete device or circuit structure.

According to a nineteenth aspect, a computer-readable storage medium is further provided. The computer-readable storage medium stores an instruction. When the instruction is run on a communications apparatus, the communications apparatus is enabled to perform the communication method according to any one of the sixteenth aspect or the possible implementations thereof.

According to a twentieth aspect, a computer program product including an instruction is further provided. When the instruction is run on a communications apparatus, the communications apparatus is enabled to perform the communication method according to any one of the sixteenth aspect or the possible implementations thereof.

It should be noted that the instruction may be all or partially stored in a first computer storage medium. The first computer storage medium may be packaged together with a processor, or the first computer storage medium and a processor may be separately packaged. This is not specifically limited in this application.

In this application, for detailed descriptions of the seventeenth aspect, the eighteenth aspect, the nineteenth aspect, the twentieth aspect, and various implementations of the seventeenth aspect, the eighteenth aspect, the nineteenth aspect, and the twentieth aspect, refer to detailed descriptions of the sixteenth aspect and the implementations of the sixteenth aspect. In addition, for beneficial effects of the seventeenth aspect, the eighteenth aspect, the nineteenth aspect, the twentieth aspect, and the various implementations of the seventeenth aspect, the eighteenth aspect, the nineteenth aspect, and the twentieth aspect, refer to analyses of the beneficial effects of the sixteenth aspect and the implementations of the sixteenth aspect. Details are not described herein again.

According to a twenty-first aspect, a communications system is provided. The communications system includes the communications apparatus according to any one of the second aspect to the fifth aspect, the communications apparatus according to any one of the seventh aspect to the tenth aspect, and the communications apparatus according to any one of the twelfth aspect to the fifteenth aspect.

In an embodiment, the communications system further includes the communications apparatus according to any one of the seventeenth aspect to the twentieth aspect.

In this application, a name of the foregoing communications apparatus does not constitute any limitation to devices or function modules. During actual implementation, these devices or function modules may have other names. Provided that functions of the devices or the function modules are similar to those in this application, the devices or the function modules fall within the scope of the claims in this application and equivalent technologies thereof.

These aspects or other aspects in this application are more concise and comprehensible in the following description.

BRIEF DESCRIPTION OF DRAWINGS

FIG. 10A to FIG. 10C are a schematic flowchart 3 of a communication method according to an embodiment of this application;

FIG. 11A and FIG. 11B are a schematic flowchart 4 of a communication method according to an embodiment of this application;

DESCRIPTION OF EMBODIMENTS

In embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example" or the like is intended to present a related concept in a specific manner.

In the following descriptions, terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

In the embodiments of this application, an evolved node base station (eNB) in a long term evolution (LTE) system is referred to as an LTE eNB, UE in the LTE system is referred to as LTE UE, and UE in a 5G system is referred to as 5G UE.

Figure 1:
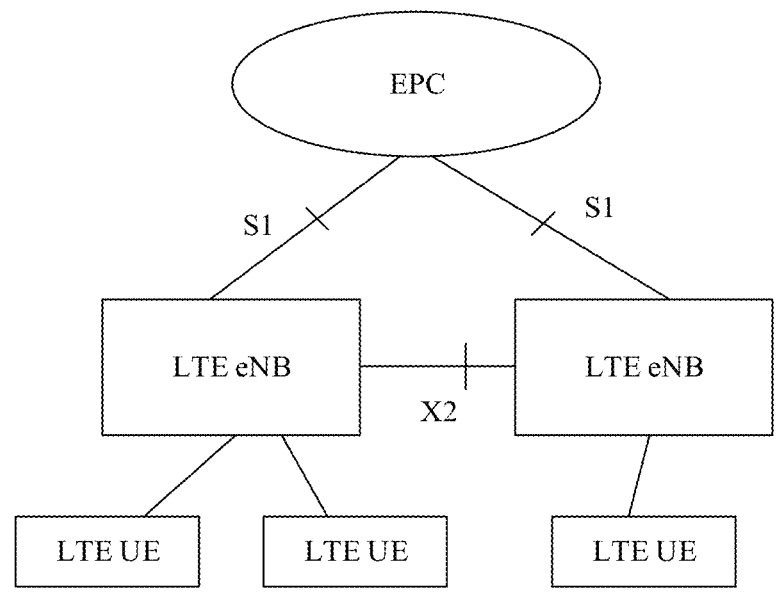
FIG. 1 shows a network architecture of a conventional LTE system.

In the conventional LTE system, the LTE eNB accesses an evolved packet core (EPC) network through an S1 interface, and different LTE eNBs are connected to each other through an X2 interface. Each LTE eNB is connected to at least one LTE UE. FIG. 1 shows a network architecture of the conventional LTE system. During actual application, a connection between the LTE eNB and the LTE UE is a wireless connection. To conveniently and intuitively represent a connection relationship between devices, solid lines are used for illustration in FIG. 1.

As communications technologies develop, the LTE eNB may evolve into a next generation LTE base station (Next Generation eNB, ng-eNB). The ng-eNB provides a radio transmission resource for UE by using an evolved universal terrestrial radio access (E-UTRA) technology. The ng-eNB may provide a 5th-generation core network (5GCN) service for the UE, or may provide an EPC service for the UE. During actual deployment, the ng-eNB may be connected to only a 5GCN/an EPC, or may be connected to both a 5GCN and an EPC. The 5GCN may also be referred to as a 5GC.

An access network (RAN) in the 5G system is referred to as a next generation RAN (NG-RAN), and an NG-RAN node includes an ng-eNB and a gNB (base stations in the 5G system). The gNB provides a radio transmission resource for the 5G UE by using a new radio (NR) technology, and provides a 5GC service for the 5G UE.

Figure 2:
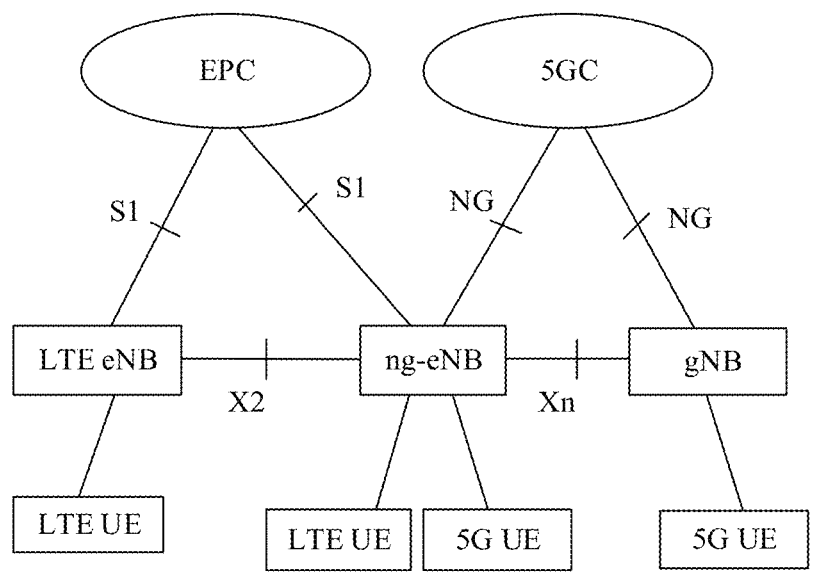
FIG. 2 is a schematic structural diagram of a network in which a 4G system and a 5G system coexist.

FIG. 2 shows a structure of a network in which a 4G system and a 5G system coexist. As shown in FIG. 2, an ng-eNB may access an EPC through an S1 interface, and may further access a 5GC through another corresponding interface (represented by NG in FIG. 2). 5G UE connected to the ng-eNB may access the 5GC via the ng-eNB. LTE UE connected to the ng-eNB may access the EPC via the ng-eNB. An LTE eNB is connected, through an X2 interface, to the ng-eNB connected to the EPC, and the ng-eNB is connected to a gNB through an Xn interface. Likewise, during actual application, connections between the foregoing plurality of devices and the UE may be wireless connections. To conveniently and intuitively represent connection relationships between devices, solid lines are used for illustration in FIG. 2.

In the LTE system, the LTE UE may be in an RRC idle mode (RRC Idle mode) or an RRC connected mode. In a scenario in which the LTE UE is in an RRC idle mode, the LTE UE deletes an access stratum (AS) context, a core network device retains a context of the LTE UE, a RAN device does not have the context of the LTE UE, and there is no dedicated signaling connection (UE associated S1 connection), to the LTE UE, between the core network device and the RAN device. When downlink data of the LTE UE arrives, the core network device initiates paging of the LTE UE in a tracking area (TA) of the LTE UE, where the tracking area may also be referred to as a paging area. The LTE UE monitors a paging channel to determine whether to transition to the RRC connected mode to receive the downlink data. When the LTE UE needs to send uplink data, the LTE UE also proactively transitions to the RRC connected mode, to complete sending of the uplink data. When LTE UE in an RRC idle mode crosses TAs, tracking area update (TAU) needs to be performed. In a scenario in which the LTE UE is in an RRC connected mode, both the core network device and a RAN device have a context of the LTE UE, an RRC connection is maintained between the LTE UE and the RAN device, and the LTE UE may perform uplink and downlink data transmission.

Similar to the LTE UE, 5G UE may also be in an RRC idle mode or an RRC connected mode. In addition to the RRC idle mode and the RRC connected mode, the 5G UE may also be in a third mode. The third mode may also be referred to as an inactive mode (RRC INACTIVE mode or RRC INACTIVE state). When the 5G UE is in the third mode, both the 5G UE and a RAN device store an AS context of the 5G UE, a core network device stores a context of the 5G UE, there is a dedicated signaling connection (UE associated NG connection), to the 5G UE, between the core network device and the RAN device, and an RRC connection between the 5G UE and the RAN device is suspended. When downlink data of the 5G UE arrives, the RAN device may initiate paging. A paging area may be a TA in an idle mode, a RAN-based paging area (RAN-based notification area, RNA), or a cell list. When the 5G UE in the third mode crosses paging areas, location update such as TAU or RNAU (RAN-based Notification Area Update) needs to be performed. It can be learned that, for the core network device, the 5G UE in the third mode is similar to 5G UE in the connected mode. For the RAN device, the 5G UE in the third mode is similar to 5G UE in the idle mode, where the 5G UE does not have a real-time RRC connection or real-time data transmission, and downlink data needs to be transmitted to the 5G UE through paging. When uplink data of the 5G UE arrives, the UE needs to send a request to the RAN device to resume an RRC connection, to send the uplink data.

In the third mode, because the dedicated connection, to the 5G UE, between the core network device and the RAN device is not released, when the RAN device stores the AS context of the 5G UE, the 5G UE can accelerate resumption to the connected mode, and quickly perform data transmission.

The 5G system includes a heterogeneous communications system supporting multi-radio access technology dual connectivity (MR-DC). The heterogeneous communications system includes an ENDC (E-UTRA NR DC) system, an NEDC (NR E-UTRA DC) system, and an NG-ENDC (Next Generation E-UTRA NR DC) system. In the three heterogeneous communications systems, an LTE base station (LTE eNB/eLTE eNB) is connected to an NR base station (referred to as the gNB) through dual connectivity. The eLTE eNB is an LTE eNB that can be connected to an NGC. The NGC is also referred to as a 5th generation core (The 5th Generation Core, 5GC), and the eLTE eNB is also referred to as an ng-eNB.

ENDC is also referred to as option 3/3A/3X. In the ENDC communications system, an LTE eNB is a master node (MN), a gNB is a secondary node (SN), the MN is connected to an EPC, and the MN and the SN provide an air interface resource for data transmission between a terminal and the EPC.

Figure 3:
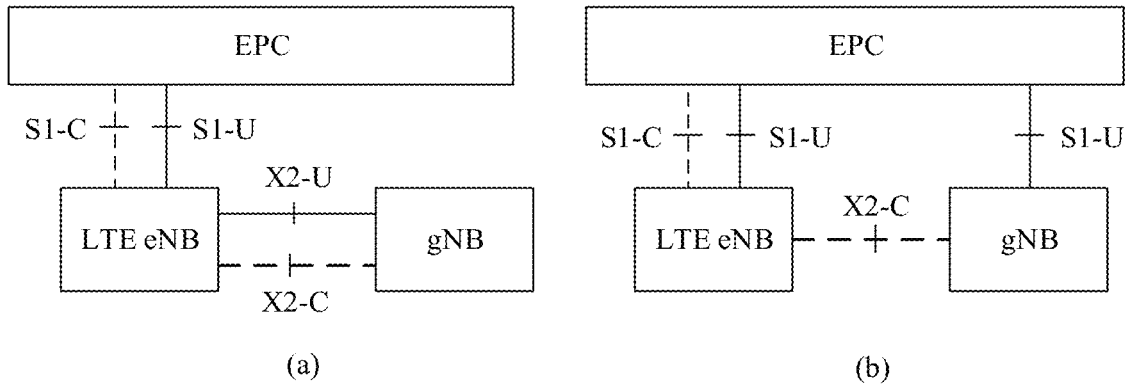
FIG. 3 is a schematic structural diagram of a communications system in an ENDC scenario.

As shown in FIG. 3, (a) in FIG. 3 is a schematic structural diagram of an option 3 communications system, and (b) in FIG. 3 is a schematic structural diagram of an option 3A communications system. In the option 3 communications system, an LTE eNB is connected to an EPC through an S1 interface (including an S1-C interface and an S1-U interface), and the LTE eNB is connected to a gNB through an X2 interface. The option 3A communications system is different from the option 3 communications system in that, a gNB is further connected to an EPC through an S1-U interface. For ease of distinguishing, in FIG. 3, control plane connections are represented by using dashed lines.

NEDC is also referred to as option 4/4A. In the NEDC communications system, a gNB is an MN, an eLTE eNB is an SN, the MN is connected to an NGC, and the MN and the SN provide an air interface resource for data transmission between a terminal and the NGC.

Figure 4:
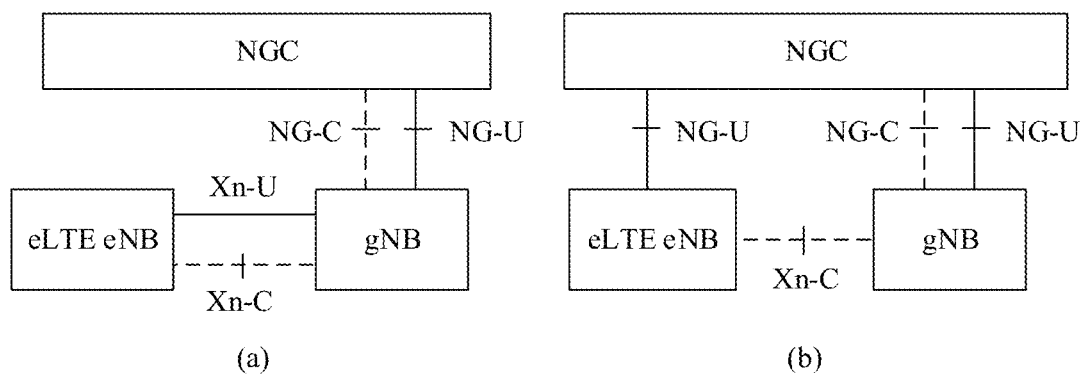
FIG. 4 is a schematic structural diagram of a communications system in an NEDC scenario.

As shown in FIG. 4, (a) in FIG. 4 is a schematic structural diagram of an option 4 communications system, and (b) in FIG. 4 is a schematic structural diagram of an option 4A communications system. In the option 4 communications system, a gNB is connected to an NGC through an NG interface (including an NG-C interface and an NG-U interface), and an eLTE eNB is connected to the gNB through an Xn interface. The option 4A communications system is different from the option 4 communications system in that, an eLTE eNB is further connected to an NGC through an NG-U interface. For ease of distinguishing, in FIG. 4, control plane connections are represented by using dashed lines.

NG-ENDC is also referred to as option 7/7A/7X. In the NG-ENDC communications system, an eLTE eNB is an MN, a gNB is an SN, and the MN is connected to an NGC. The NG-ENDC communications system is different from the ENDC communications system in that, the MN and the SN provide an air interface resource for data transmission between a terminal and the NGC.

Figure 5:
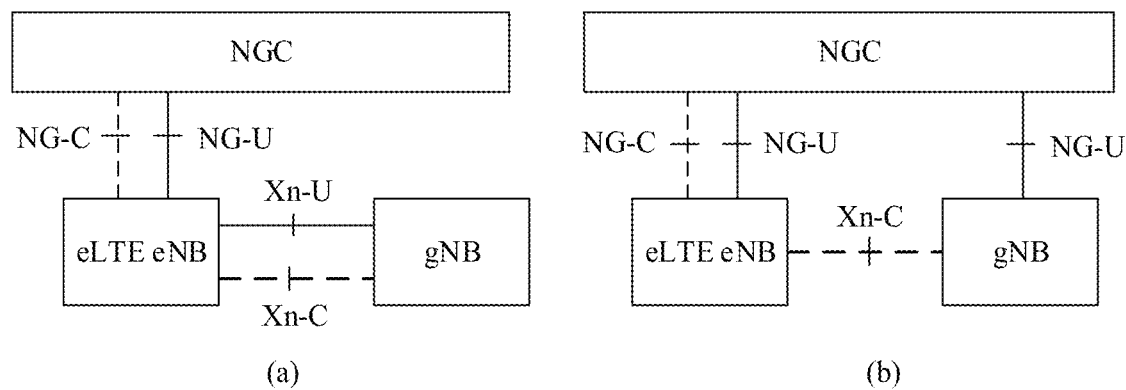
FIG. 5 is a schematic structural diagram of a communications system in an NG-ENDC scenario.

As shown in FIG. 5, (a) in FIG. 5 is a schematic structural diagram of an option 7 communications system, and (b) in FIG. 5 is a schematic structural diagram of an option 7A communications system. In the option 7 communications system, an eLTE eNB is connected to an NGC through an NG interface (including an NG-C interface and an NG-U interface), and an eLTE eNB is connected to the gNB through an Xn interface. The option 7A communications system is different from the option 7 communications system in that, a gNB is further connected to an NGC through an NG-U interface. For ease of distinguishing, in FIG. 5, control plane connections are represented by using dashed lines.

It can be learned that both the base station in the NE-DC communications system and the base station in the NG EN-DC communications system are NG-RAN nodes, and are connected to the 5GC. Therefore, the terminal in the NE-DC communications system and the terminal in the NG EN-DC communications system can support the third mode. Currently, in the NE-DC communications system and the NG EN-DC communications system, after a terminal enters a third mode from a connected mode, the terminal deletes a related configuration, stored in the terminal, of a secondary node, that is, deletes the SCG configuration information. In addition, a master node releases the secondary node. When the terminal resumes from the third mode to the connected mode, the master node that currently serves the terminal needs to reconfigure a secondary node for the terminal. However, because a procedure of reconfiguring a secondary node for the terminal by the master node that currently serves the terminal is relatively long, it is difficult for the terminal to quickly transmit data through an air interface of the secondary node.

To resolve the foregoing problem, the embodiments of this application provide a communication method. After receiving a first message that is sent by a terminal and that is used to request the terminal to resume from a third mode to a connected mode, a first master node determines a secondary node that serves the terminal, and obtains a first security parameter and SCG configuration information. Then, the first master node sends a second message including the first security parameter and the SCG configuration information to the terminal. Herein, the first security parameter is used to derive a security key used for communication between the terminal and the secondary node that serves the terminal, and the SCG configuration information includes at least one of a random access resource allocated to the terminal by the secondary node that serves the terminal, information about a serving cell set of the secondary node that serves the terminal, and indication information of a master cell of the secondary node that serves the terminal. The first security parameter and SCG configuration information are necessarily required for the communication between the terminal and the secondary node that serves the terminal. Therefore, after the first master node sends both the first security parameter and the SCG configuration information to the terminal, the terminal may directly complete, based on the first security parameter and the SCG configuration information, the communication connection to the secondary node that serves the terminal. This effectively improves a rate of configuring an SCG when the terminal resumes from the third mode to the connected mode, and further improves efficiency of transmitting data by the terminal through an air interface of the secondary node.

The communication method provided by the embodiments of this application is applicable to the heterogeneous communications system shown in FIG. 4 or FIG. 5, and is also applicable to a 5G system that supports intra-RAT multi-connectivity, for example, DC between gNBs or DC between eLTE eNBs, so that UE and a 5GC transmit data to each other.

In the embodiments of this application, the master node may be the foregoing gNB, or may be the foregoing eLTE eNB. This is not specifically limited in the embodiments of this application. Likewise, in the embodiments of this application, the secondary node may be the foregoing gNB, or may be the foregoing eLTE eNB. This is not specifically limited in the embodiments of this application.

For example, if the embodiments of this application are applicable to the heterogeneous communications system shown in FIG. 4, a master node that serves the terminal is a gNB, and a secondary node that serves the terminal is an eLTE eNB. Herein, the master node may serve the terminal before the terminal transitions from the connected mode to the third mode, or may serve the terminal after the terminal resumes from the third mode to the connected mode. Likewise, herein, the secondary node may serve the terminal before the terminal transitions from the connected mode to the third mode, or may serve the terminal after the terminal resumes from the third mode to the connected mode.

Figure 6:
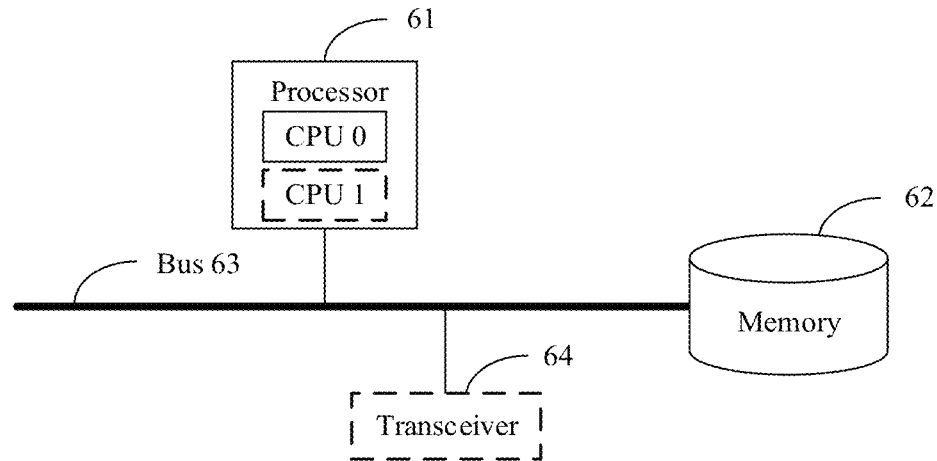
FIG. 6 is a schematic diagram of a hardware structure of a base station according to an embodiment of this application.

For ease of description, the embodiments of this application are mainly described by using the heterogeneous communications system shown in FIG. 4 or FIG. 5 as an example. With reference to FIG. 4 or FIG. 5, both the eLTE eNB and the gNB are base stations. FIG. 6 shows a composition structure of a base station (eLTE eNB/gNB) in the embodiments of this application.

As shown in FIG. 6, the base station may include a processor 61, a memory 62, and a bus 63.

The components of the base station are described in detail below with reference to FIG. 6.

The processor 61 is a control center of the base station, and may be one processor, or may be a general term of a plurality of processing elements. For example, the processor 61 is a CPU, or may be an application-specific integrated circuit (ASIC), or one or more integrated circuits configured to implement the embodiments of this application, such as one or more microprocessors (DSP) or one or more field programmable gate arrays (FPGA).

The processor 61 may perform various functions of the base station by running or executing a software program stored in the memory 62 and invoking data stored in the memory 62.

During specific implementation, in an embodiment, the processor 61 may include one or more CPUs, for example, a CPU 0 and a CPU 1 shown in the figure. The processor 61 may be a single-core (single-CPU) processor or may be a multi-core (multi-CPU) processor. The processor herein may refer to one or more devices, circuits, and/or processing cores configured to process data (for example, a computer program instruction).

The memory 62 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray optical disc, or the like), magnetic disk storage medium or another magnetic storage device, or any other medium that can be used to carry or store expected program code in a form of an instruction or a data structure and that can be accessed by a computer. However, the memory 62 is not limited thereto. The memory 62 may exist independently, and may be connected to the processor 61 through the bus 63. The memory 62 may alternatively be integrated with the processor 61.

The memory 62 is configured to store a software program for performing the solutions of this application, and the processor 61 controls execution of the software program.

The bus 63 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 6, but this does not mean that there is only one bus or only one type of bus.

In an embodiment, the base station further includes a transceiver 64. The transceiver 64 is configured to communicate with another device or a communications network under control of the processor 61, for example, configured to communicate with a communications network such as an Ethernet, a radio access network (RAN), or a wireless local area network (WLAN). The transceiver 64 may include all or a part of a baseband processor, and may further optionally include a radio frequency (RF) processor. The RF processor is configured to: send and receive an RF signal. The baseband processor is configured to process a baseband signal converted from the RF signal or a baseband signal that is to be converted into the RF signal.

Because the transceiver 64 is optional, the transceiver 64 is represented by a dashed line box in FIG. 6.

The device structure shown in FIG. 6 does not constitute a limitation on the base station. The base station may include more or fewer components than those shown in the figure, or combine some components, or have different component arrangements.

The terminal in the embodiments of this application may be a mobile phone (for example, a mobile phone 700 shown in FIG. 7), a tablet computer, a personal computer (PC), or a personal digital assistant (PDA), a smartwatch, a netbook, a wearable electronic device, or the like that can transmit data to the eLTE eNB/gNB on a control plane and a user plane. The embodiments of this application do not impose a special limitation on a specific form of the device.

Figure 7:
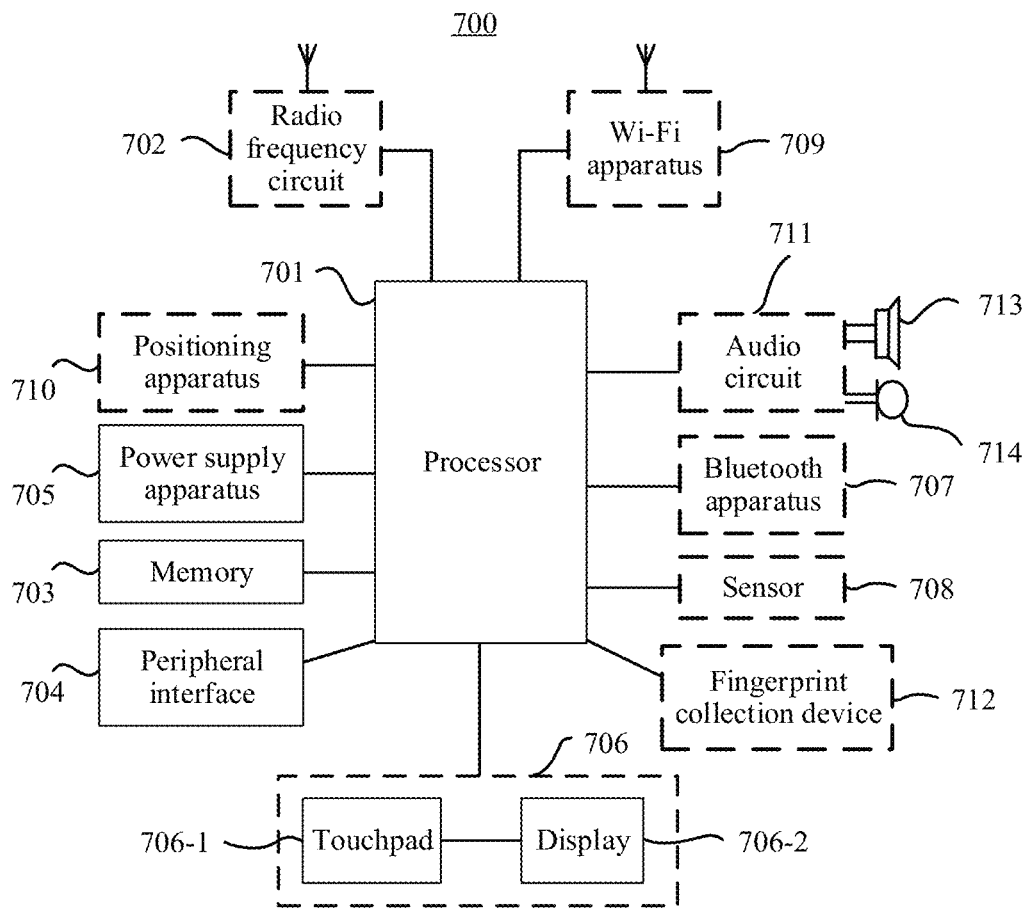
FIG. 7 is a schematic diagram of a hardware structure of a mobile phone according to an embodiment of this application.

As shown in FIG. 7, the mobile phone 700 is used as an example of the foregoing terminal. The mobile phone 700 may specifically include a processor 701, an RF circuit 702, a memory 703, a peripheral interface 704, and a power supply apparatus 705. In an embodiment, the mobile phone 700 may further include components such as a touchscreen 706, a Bluetooth apparatus 707, one or more sensors 708, a wireless fidelity (Wi-Fi) apparatus 709, a positioning apparatus 710, and an audio circuit 711. These components may communicate by using one or more communications buses or signal cables (not shown in FIG. 7).

The touchscreen 706, the Bluetooth apparatus 707, the one or more sensors 708, the wireless fidelity (Wireless Fidelity, Wi-Fi) apparatus 709, the positioning apparatus 710, and the audio circuit 711 are optional components, and are represented by dashed line boxes in FIG. 7.

The components of the mobile phone 700 are described in detail below with reference to FIG. 7.

The processor 701 is a control center of the mobile phone 700. The processor 701 is connected to all parts of the mobile phone 700 by using various interfaces and lines, and performs various functions of the mobile phone 700 and processes data by running or executing an application program stored in the memory 703 and invoking data stored in the memory 703. In some embodiments, the processor 701 may include one or more processing units. In some embodiments of this application, the processor 701 may further include a fingerprint verification chip, configured to verify a collected fingerprint.

The radio frequency circuit 702 may be configured to: receive and send a radio signal in an information sending/receiving process or a call process. Particularly, after receiving downlink data from a base station, the radio frequency circuit 702 may send the downlink data to the processor 701 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 702 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 703 is configured to store the application program and the data. The processor 701 performs various functions of the mobile phone 700 and processes data by running the application program and the data that are stored in the memory 703. The memory 703 mainly includes a program storage area and a data storage area. The program storage area may store an operating system, and an application program required by at least one function (for example, a sound playing function or an image processing function). The data storage area may store data (for example, audio data or a phone book) created based on use of the mobile phone 700. In addition, the memory 703 may include a high-speed random access memory (RAM), and may further include a non-volatile memory such as a magnetic disk storage device, a flash memory, or another volatile solid-state storage device. The memory 703 may store various operating systems such as an iOS operating system and an Android operating system. The memory 703 may be standalone, and is connected to the processor 701 through the communications bus. The memory 703 may alternatively be integrated with the processor 701.

The peripheral interface 704 is configured to provide various interfaces for an external input/output device (for example, a keyboard, a mouse, an external display, an external memory, or a subscriber identification module card). For example, the mobile phone is connected to the mouse by using a universal serial bus (USB) interface, and is connected, by using a metal contact on a card slot of the subscriber identity module card, to the subscriber identification module card (SIM) card provided by a telecommunications operator. The peripheral interface 704 may be configured to couple the external input/output peripheral device to the processor 701 and the memory 703.

The power supply apparatus 705 is configured to supply power to components of the mobile phone 700. The power supply apparatus 705 may be a battery and a power management chip. The battery may be logically connected to the processor 701 via the power management chip, to implement functions such as charging management, discharging management, and power consumption management via the power supply apparatus 705.

The touchscreen 706 may specifically include a touchpad 706-1 and a display 706-2.

The touchpad 706-1 may collect a touch event (for example, an operation performed by a user of the mobile phone 700 on the touchpad 706-1 or near the touchpad 706-1 by using any proper object such as a finger or a stylus) performed by the user on or near the touchpad 706-1, and send collected touch information to another device (for example, the processor 701). The touch event performed by the user near the touchpad 706-1 may be referred to as a floating touch. The floating touch may mean that the user does not need to directly touch the touchpad to select, move, or drag an object (for example, an icon), and the user only needs to be near a device to perform a desired function. In addition, the touchpad 706-1 may be implemented in a plurality of types such as a resistive type, a capacitive type, an infrared type, and a surface acoustic wave type.

The display (also referred to as a display screen) 706-2 may be configured to display information entered by the user or information provided for the user, and various menus of the mobile phone 700. The display 706-2 may be configured in a form such as a liquid crystal display or an organic light-emitting diode. The touchpad 706-1 may cover the display 706-2. When detecting the touch event on or near the touchpad 706-1, the touchpad 706-1 transfers the touch event to the processor 701 to determine a type of the touch event. Then, the processor 701 can provide corresponding visual output on the display 706-2 based on the type of the touch event. Although the touchpad 706-1 and the display 706-2 in FIG. 7 are used as two independent components to implement input and output functions of the mobile phone 700, in some embodiments, the touchpad 706-1 and the display 706-2 may be integrated to implement the input and output functions of the mobile phone 700. It may be understood that the touchscreen 706 is formed by stacking a plurality of layers of materials. In the embodiments of this application, only the touchpad (layer) and the display (layer) are displayed, and another layer is not recorded in the embodiments of this application. In addition, the touchpad 706-1 may be disposed on a front side of the mobile phone 700 in a form of a full panel, and the display 706-2 may also be disposed on the front side of the mobile phone 700 in a form of a full panel. Therefore, a frameless structure can be implemented for the front side of the mobile phone.

In an embodiment, the mobile phone 700 may further have a fingerprint recognition function. For example, a fingerprint collection device 712 may be disposed on a back side (for example, below a rear-facing camera) of the mobile phone 700, or may be disposed on the front side (for example, below the touchscreen 706) of the mobile phone 700. For another example, a fingerprint collection component 712 may be disposed on the touchscreen 706 to implement a fingerprint recognition function. In other words, the fingerprint collection component 712 may be integrated with the touchscreen 706 to implement the fingerprint recognition function of the mobile phone 700. In this case, the fingerprint collection component 712 is disposed on the touchscreen 706, and may be a part of the touchscreen 706, or may be disposed on the touchscreen 706 in another manner. A main component of the fingerprint collection device 712 in the embodiments of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The Bluetooth apparatus 707 is configured to implement data exchange between the mobile phone 700 and another short-range device (such as a mobile phone or a smartwatch). In the embodiments of this application, the Bluetooth apparatus may be an integrated circuit, a Bluetooth chip, or the like.

The mobile phone 700 may further include at least one type of sensor 708, such as a light sensor, a motion sensor, and another sensor. Specifically, the light sensor may include an ambient light sensor and a proximity sensor. The ambient light sensor may adjust luminance of the display of the touchscreen 706 based on intensity of ambient light. The proximity sensor may power off the display when the mobile phone 700 is moved to an ear. As one type of the motion sensor, an accelerometer sensor may detect acceleration values in all directions (usually on three axes). The accelerometer sensor may detect a value and a direction of gravity when the accelerometer sensor is stationary, and may be used in an application for recognizing a mobile phone posture (such as switching between landscape mode and portrait mode, a related game, or magnetometer posture calibration), a function related to vibration recognition (such as a pedometer or a knock), or the like. For another sensor that may be further disposed in the mobile phone 700, such as a gyroscope, a barometer, a hygrometer, a thermometer, or an infrared sensor, details are not described herein.

The Wi-Fi apparatus 709 is configured to provide, for the mobile phone 700, network access that complies with a Wi-Fi-related standard protocol. The mobile phone 700 may access a Wi-Fi access point via the Wi-Fi apparatus 709, to help the user to receive and send an email, browse a web page, access streaming media, and the like. The Wi-Fi apparatus 709 provides wireless broadband internet access for the user. In some other embodiments, the Wi-Fi apparatus 709 may also be used as a Wi-Fi wireless access point, and may provide Wi-Fi network access for another device.

The positioning apparatus 710 is configured to provide a geographical location for the mobile phone 700. It may be understood that the positioning apparatus 710 may be specifically a receiver of a positioning system such as a global positioning system (GPS), a BeiDou navigation satellite system, or a Russian GLONASS. After receiving a geographic location sent by the positioning system, the positioning apparatus 710 sends the information to the processor 701 for processing, or sends the information to the memory 703 for storage. In some other embodiments, the positioning apparatus 710 may alternatively be a receiver of an assisted global positioning system (AGPS). The AGPS system serves as an assisted server to assist the positioning apparatus 710 in completing ranging and positioning services. In this case, the assisted positioning server communicates with a device such as the positioning apparatus 710 (namely, a GPS receiver) of the mobile phone 700 through a wireless communications network, to provide positioning assistance. In some other embodiments, the positioning apparatus 710 may alternatively be a positioning technology based on a Wi-Fi access point. Each Wi-Fi access point has a globally unique MAC address, and the device may scan and collect a broadcast signal of a surrounding Wi-Fi access point when Wi-Fi is enabled. Therefore, the device may obtain a MAC address broadcast through the Wi-Fi access point. The device sends such data (for example, the MAC address) that can identify the Wi-Fi access point to a location server through the wireless communications network. The location server retrieves a geographical location of each Wi-Fi access point, calculates a geographical location of the device with reference to strength of the Wi-Fi broadcast signal, and sends the geographical location of the device to the positioning apparatus 710 of the device.

The audio frequency circuit 711, a loudspeaker 713, and a microphone 714 may provide an audio interface between the user and the mobile phone 700. The audio circuit 711 may convert received audio data into an electrical signal and then transmit the electrical signal to the speaker 713, and the speaker 713 converts the electrical signal into a sound signal for output. In addition, the microphone 714 converts a collected sound signal into an electrical signal. The audio circuit 711 receives the electrical signal, converts the electrical signal into audio data, and then outputs the audio data to the RF circuit 702, to send the audio data to, for example, another mobile phone, or outputs the audio data to the memory 703 for further processing.

Although not shown in FIG. 7, the mobile phone 700 may further include a camera (a front-facing camera and/or a rear-facing camera), a flash, a micro projection apparatus, a near field communication (Near Field Communication, NFC) apparatus, and the like. Details are not described herein.

A person skilled in the art may understand that a hardware structure shown in FIG. 7 does not constitute a limitation on the mobile phone, and the mobile phone 700 may include more or fewer components than those shown in the figure, or some components may be combined, or the mobile phone 700 may have different component arrangements.

The following describes a communication method provided by this application.

It can be learned from the foregoing descriptions that, in a 5G communications system, an RRC state of a terminal may be transitioned from a connected mode to a third mode, and subsequently, the RRC state of the terminal may be resumed from the third mode to the connected mode. For ease of description, in the embodiments of this application, a master node 1 is used to represent a master node that serves the terminal before the terminal transitions from the connected mode to the third mode, that is, the master node 1 represents a second master node; a master node 2 is used to represent a master node that serves the terminal after the terminal resumes from the third mode to the connected mode, that is, the master node 2 represents a first master node; a secondary node 1 is used to represent a secondary node that serves the terminal before the terminal transitions from the connected mode to the third mode, that is, the secondary node 1 represents a first secondary node; a secondary node 2 is used to represent a secondary node that serves the terminal after the terminal resumes from the third mode to the connected mode, that is, the secondary node 2 represents a second secondary node.

Figure 8A:
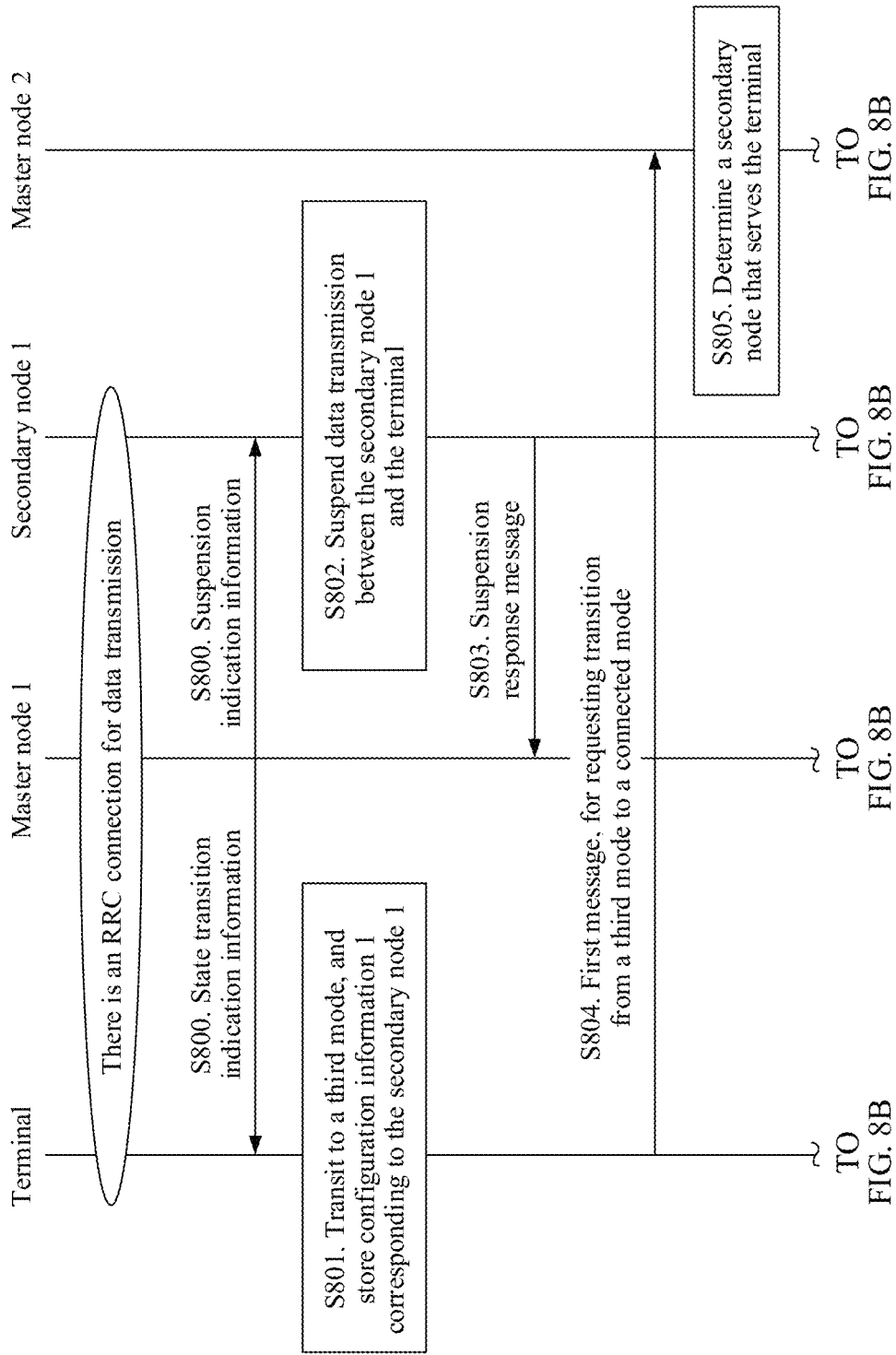
FIG. 8A and FIG. 8B are a schematic flowchart 1 of a communication method according to an embodiment of this application.
Figure 8B:
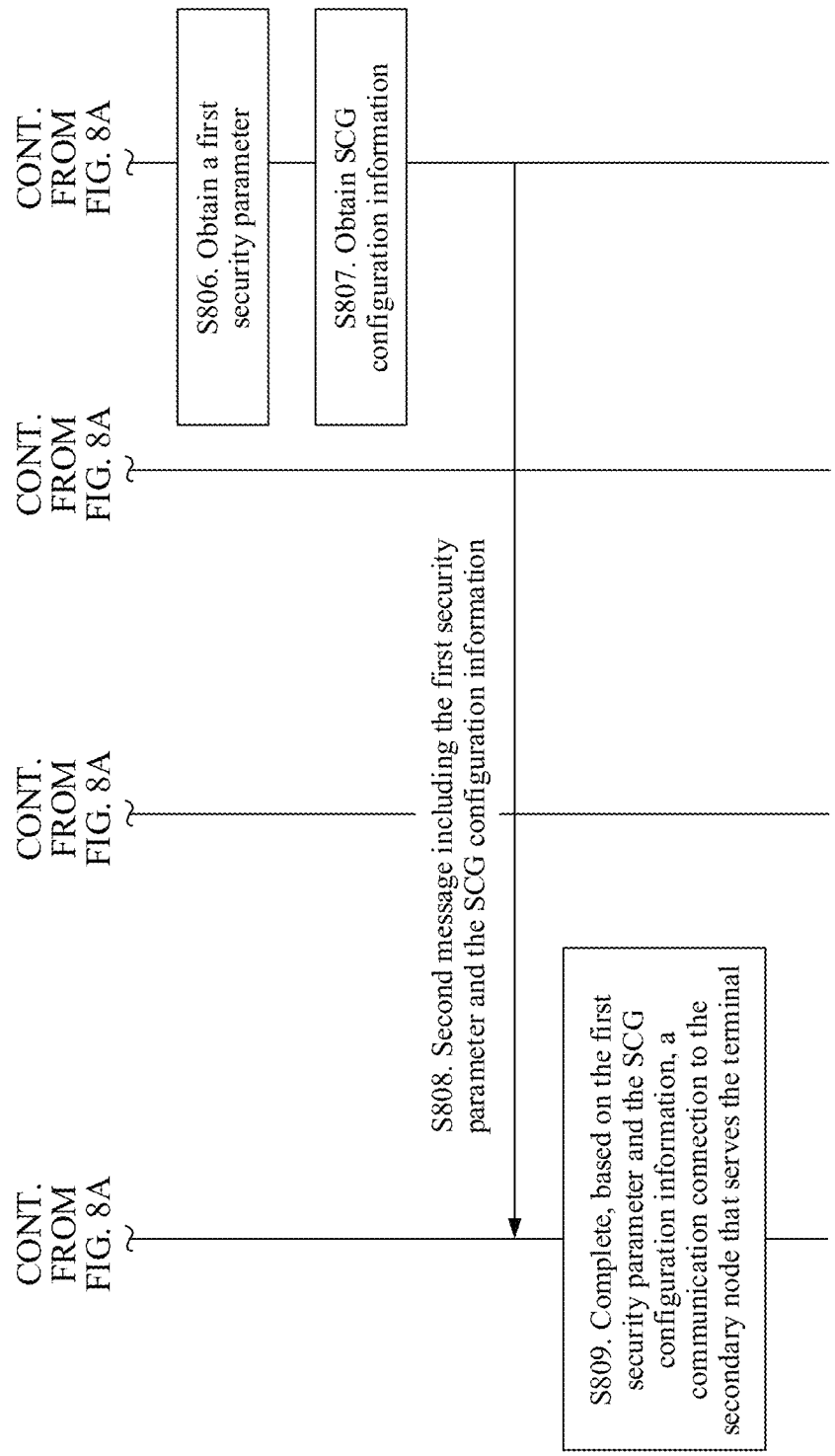

FIG. 8A and FIG. 8B are a schematic flowchart of a communication method according to an embodiment of this application. As shown in FIG. 8A and FIG. 8B, in the communication method provided by this embodiment of this application, operation S800 is performed by a processor in a master node 1, operations S801, S804, and S809 are performed by a processor in a terminal, operations S802 and S803 are performed by a processor in a secondary node 1, and S805, S806, S807, and S808 are performed by a processor in a master node 2.

Referring to FIG. 8A and FIG. 8B, the communication method includes the following operations.

Operation S800. After determining to transition an RRC state of the terminal from a connected mode to a third mode, the master node 1 sends state transition indication information to the terminal, and sends suspension indication information to the secondary node 1.

An RRC connection exists between the master node 1 and the terminal, and the master node 1 configures DC for the terminal, for example, the master node 1 selects the secondary node 1 as a secondary node of the terminal.

The terminal transmits data by using an air interface resource of the master node 1 and an air interface resource of the secondary node 1. Security protection is performed, based on an initial MN security key, on data, for example, data on a data radio bearer (DRB) or signaling on a signaling radio bearer (SRB), communicated between the terminal and the master node 1. Security protection is performed, based on an initial SN security key, on data communicated between the terminal and the secondary node 1.

The security protection herein may refer to encryption and decryption, integrity protection, and integrity check. The encryption and decryption needs to be performed based on an encryption key and an encryption algorithm. The integrity protection/integrity check needs to be performed based on an integrity protection key and an integrity protection algorithm. Generally, the encryption key is derived based on a base key and the encryption algorithm, and the integrity protection key is derived based on the base key and the integrity protection algorithm. The encryption algorithm and the integrity protection algorithm may be the same or may be different. Optionally, both the encryption algorithm and the integrity protection algorithm may be configured by a base station to which a packet data convergence protocol (PDCP) entity belongs. For example, the master node 1 configures an encryption algorithm and an integrity protection algorithm that are used for an MN bearer, and the secondary node 1 configures an encryption algorithm and an integrity protection algorithm that are used for an SN bearer. For example, the base key may be KeNB or KgNB.

Two types of radio bearers can be set up for the UE when the DC is configured for the UE. The first type is a bearer (MN terminated bearer) for which a packet data convergence protocol (PDCP) is terminated on an MN, and is referred to as an MN bearer for short. For this bearer, a PDCP on a base station side is deployed on the MN, and security-related processing is performed by the PDCP on the MN. The second type is a bearer (SN terminated bearer) for which a PDCP is terminated on an SN, and is referred to as an SN bearer for short. For this bearer, a PDCP on a base station side is deployed on the SN, and security-related processing is performed by the PDCP on the SN. Each of PDCP protocol data units (PDU) on the MN bearer and the SN bearer may be sent by using an MN air interface resource and/or an SN air interface resource. When data on a bearer is sent by using only an MN air interface resource, the bearer is referred to as a master cell group (MCG) bearer. When data on a bearer is sent by using only an SN air interface resource, the bearer is referred to as a secondary cell group (SCG) bearer. When data on a bearer is sent by using both an MN air interface resource and an SN air interface resource, the bearer is referred to as a split (split) bearer. In this case, if the bearer is an MN bearer, the bearer is an MCG split bearer; if the bearer is an SN bearer, the bearer is an SCG split bearer.

In this embodiment of this application, keys used for encryption and integrity protection are collectively referred to as a security key, and the encryption algorithm and the integrity protection algorithm are collectively referred to as a security algorithm. In other words, the security key includes the encryption key and/or the integrity protection key, and the security algorithm includes the encryption algorithm and/or the integrity protection algorithm.

For example, the encryption key includes an encryption key used for RRC signaling and/or an encryption key used for data. The integrity protection key includes an integrity protection key used for RRC signaling and/or an integrity protection key used for data. The encryption algorithm includes an encryption algorithm used for RRC signaling and/or an encryption algorithm used for data. The integrity protection algorithm includes an integrity protection algorithm used for RRC signaling and/or an integrity protection algorithm used for data.

In a scenario in which the terminal transmits data by using the air interface resource of the master node 1 and the air interface resource of the secondary node 1, a security context of the terminal includes at least one of an initial MN base key, an initial SN base key, and an initial MN security key (a key used for MN link security protection), an initial MN security algorithm (an algorithm used for MN link security protection), an initial SN security key (a key used for SN link security protection), an initial SN security algorithm (an algorithm used for SN link security protection), a next hop parameter (NH), a next hop chaining count parameter (NCC), and an SN security parameter. The SN security parameter is used to obtain the initial SN base key based on the initial MN base key. For example, the SN security parameter is an Sk counter.

After the master node 1 determines to transition the RRC state of the terminal from the connected mode to the third mode, the master node 1 sends the state transition indication information to the terminal, where the state transition indication information is used to indicate the RRC state of the terminal to be transitioned from the connected mode to the third mode.

In an embodiment, the state transition indication information may be carried in a message 1. For example, the message 1 may be an RRC connection release (RRC Connection Release or RRC Release) message.

In an embodiment, the state transition indication information may be directly (or explicitly) or indirectly (or implicitly) embodied. This is not specifically limited in the embodiments of this application.

For example, if the state transition indication information is directly embodied, the state transition indication information may be an RRC inactive command. If the state transition indication information is indirectly embodied, the state transition indication information may be a terminal identifier 1, where the terminal identifier 1 is a dedicated identifier used when the terminal is in a third mode in an access network area, for example, an inactive radio network temporary identifier (I-RNTI) or a resume ID. The access network area may include one or more cells, or include one or more tracking areas (TA), or include one or more RAN areas. A tracking area is identified by a TA code (TAC). A RAN area is identified by a RAN area, and the RAN area code is unique in a TA.

In an embodiment, the message 1 may further include a second security parameter. The second security parameter is used by the terminal to derive, based on a current initial MN base key, a base key used to communicate with a base station next time. For example, the second security parameter is a next hop chaining count parameter (NCC). In an embodiment, the terminal stores the second security parameter in the security context of the terminal.

After the master node 1 determines to transition the RRC state of the terminal from the connected mode to the third mode, the master node 1 sends the suspension indication information to the secondary node 1 through an interface (for example, an Xn interface) between base stations. The suspension indication information is used to suspend data transmission between the secondary node 1 and the terminal.

In an embodiment, the suspension indication information may be directly (or explicitly) or indirectly (or implicitly) embodied. This is not specifically limited in the embodiments of this application. For example, the suspension indication information may be carried in a secondary node modification (SN Modification) message or a secondary node release (SN Release) message on an Xn interface.

It should be noted that, the master node 1 may first send the state transition indication information to the terminal and then send the suspension indication information to the secondary node 1, or may first send the suspension indication information to the secondary node 1 and then send the state transition indication information to the terminal, or may send the suspension indication information to the secondary node 1 at the same time when sending the state transition indication information to the terminal. This is not specifically limited in the embodiments of this application.

In an embodiment, before sending the state transition indication information to the terminal, the master node 1 needs to determine that there is no downlink data of the terminal to be transmitted. The master node 1 may determine, by itself, data (including data transmitted on an MN bearer and an SN bearer through an air interface of the master node) transmitted on a master node side, but the master node 1 cannot determine in real time whether the secondary node 1 has to-be-transmitted downlink data of the terminal. Especially on the SN bearer, downlink data is directly sent by a core network to the secondary node 1, and the master node 1 cannot perceive a status of data transmission to the secondary node 1. This embodiment of this application further provides a method used by the master node 1 to determine whether the RRC state of the terminal can be transitioned from the connected mode to the third mode. This method may be used as an independent method, or may be used in combination with other operations in this embodiment. The method specifically includes: Before sending the state transition indication information to the terminal, the master node 1 sends the suspension requirement indication to the secondary node 1, to query the secondary node 1 whether the terminal can transition from the connected mode to the third mode. If the secondary node 1 allows the terminal to transition from the connected mode to the third mode (optionally, if there is no uplink data or downlink data of the terminal at the secondary node 1 within a preset time period, the secondary node 1 allows the terminal to transition to the third mode), the secondary node 1 sends a suspension acknowledgment indication to the master node 1, to indicate that the secondary node agrees that the terminal transitions from the connected mode to the third mode. On the contrary, if the secondary node 1 does not allow the terminal to transition to the third mode, the secondary node 1 sends a suspension reject indication to the master node 1. Optionally, the suspension reject indication may include a cause value indicating that there is still to-be-transmitted downlink data of the terminal and/or to-be-transmitted uplink data of the terminal. Optionally, the suspension reject indication may further include bearer information of the to-be-transmitted uplink and/or downlink data of the terminal, such as a data radio bearer identifier, a quality of service (QOS) flow (flow) identifier, or a packet data unit (PDU) session identifier.

Operation S801. After receiving the state transition indication information, the terminal transitions the RRC state of the terminal to the third mode, and stores configuration information 1 corresponding to the secondary node 1.

The configuration information 1 includes at least one of configuration information of an SCG bearer or a PDCP state of an SN bearer.

In an embodiment, the configuration information of the SCG bearer may include any one or any combination of the following information: information about a serving cell set that is of the secondary node 1 and that serves the terminal, a DRB identifier, and an RLC configuration. The serving cell set of the secondary node 1 includes at least one master cell (also referred to as a special cell or a PScell), and may further include one or more secondary cells.

After receiving the state transition indication information, in addition to the configuration information 1, the terminal may further store at least one of a current security context, a radio bearer configuration (SRB/DRB, where a specific bearer type may be an MN bearer or an SN bearer), a C-RNTI used in a source cell (C-RNTI used in the source PCell), a cell identity and a physical cell identity of the source cell (the cell Identity and the physical cell identity of the source PCell), and a terminal identifier 1.

The radio bearer configuration may include any one or any combination of the following information: a radio bearer identifier, a radio link control (RLC) protocol configuration, a packet data convergence protocol PDCP configuration, and a service data adaptation protocol (SDAP) configuration.

The current security context includes at least one of the initial MN base key, the initial SN base key, the initial MN security key, the initial SN security key, the initial MN security algorithm, the initial SN security algorithm, the next hop parameter (Next Hop parameter, NH), and the NCC.

In an embodiment, after receiving the state transition indication information, the terminal suspends all data radio bearers (DRB) and all SRBs (for example, an SRB 1 and an SRB 2) except a signaling radio bearer (SRB) 0. When an SRB (for example, the SRB1) or a DRB is a split bearer, the terminal considers that an SN link (that is, a link on which data is transmitted via an SCG) is deactivated. Subsequently, after the terminal sends a first message to the master node 2, that is, when the SRB (for example, the SRB 1) or the DRB is resumed (resume) after S804 is performed, only the MN link (that is, a link on which data is transmitted via the MCG) is resumed. In other words, signaling or data is transmitted through the MN link. In an embodiment, whether the SN link is subsequently resumed depends on configuration information that is of the SN link and that is sent by the master node 2.

Operation S802. After receiving the suspension indication information, the secondary node 1 suspends (suspend) the data transmission between the secondary node 1 and the terminal.

Operation S803. The secondary node 1 sends a suspension response message to the master node 1, to indicate that the data transmission between the secondary node 1 and the terminal has been suspended.

The suspension response message includes configuration information 2. The configuration information 2 includes at least one of the configuration information of a secondary cell group SCG bearer, configuration information of an SN bearer, and a PDCP state of the SN bearer. The configuration information of the SN bearer includes at least one of a radio bearer identifier, a PDCP configuration, and an SDAP configuration.

In an embodiment, the configuration information 2 may further include a random access resource allocated by the secondary node 1 to the terminal, so that the master node 1 can store the random access resource allocated by the secondary node 1 to the terminal. In this way, if the terminal resumes from the third mode to the connected mode, and the secondary node 1 still serves the terminal after the terminal resumes to the connected mode, the master node 2 (or the master node 1) does not need to request the random access resource from the secondary node 1 by using an interface message. Therefore, a delay in obtaining the random access resource by the terminal and accessing the secondary node 1 based on the random access resource is reduced. Optionally, the secondary node 1 may update the random access resource, to ensure validity of the random access resource. A procedure of updating the random access resource by the secondary node 1 may be periodic, or may be initiated by the secondary node 1, or may be requested by the master node 1. This is not specifically limited in the embodiments of this application.

In an embodiment, the secondary node 1 retains the configuration information 2. In a scenario in which the secondary node 1 retains the configuration information 2, if the terminal resumes from the third mode to the connected mode, and the secondary node 1 still serves the terminal after the terminal resumes to the connected mode, the secondary node 1 does not need to reconfigure the terminal and/or re-establish an NG/Xn connection, thereby effectively improving a rate of transmitting data by the terminal through an air interface of the secondary node. It should be noted that, in the scenario in which the secondary node 1 retains the configuration information 2, the secondary node 1 may delete some information in the configuration information 2, for example, delete the configuration information of the SCG bearer, and retain the configuration information of the SN bearer and/or the PDCP state of the SN bearer. When the secondary node 1 includes a centralized unit (CU) and a distributed unit (DU), the CU may indicate the DU to delete a terminal context stored on the DU, for example, the configuration information of the SCG bearer.

In an embodiment, after receiving the suspension indication information (for example, the suspension indication information is carried in the SN release message), the secondary node 1 deletes the terminal context (including the configuration information 2), releases a dedicated resource (for example, a dedicated signaling connection of the terminal on an Xn-interface control plane, and a dedicated GPRS tunneling protocol (GTP) tunnel of the terminal on an Xn-interface user plane) allocated to the terminal by the secondary node 1 on an interface between the secondary node 1 and the master node 1, and releases a dedicated resource (for example, including a dedicated GTP tunnel of the terminal on an NG-interface user plane) allocated to the terminal by the secondary node 1 on an interface between the secondary node 1 and the 5GC. This process is the same as a process of releasing a secondary node for the terminal. In this scenario, if the terminal resumes from the third mode to the connected mode subsequently, the secondary node 1 no longer serves the terminal, and the master node 1 no longer needs to indicate the secondary node 1 to delete the terminal context and the dedicated resources on the interfaces, that is, the following operation S915, S1018, or S1116 does not need to be performed. In this scenario, that the secondary node 1 suspends the data transmission between the secondary node 1 and the terminal may be understood as that the secondary node 1 stops the data transmission with the terminal.

In an embodiment, correspondingly, after receiving the suspension response message, the master node 1 stores the configuration information 2.

It should be noted that, after the master node 1 transitions the terminal from the connected mode to the third mode, the master node 1 and the secondary node 1 suspend communication with the terminal. However, in a scenario in which downlink data of the terminal exists, the core network still sends the downlink data of the terminal to the master node 1 or the secondary node 1. When the secondary node 1 retains the dedicated resource allocated to the terminal on the interface between the secondary node 1 and the core network, the secondary node 1 receives the downlink data of the terminal from the core network on the interface, and the secondary node 1 sends a paging request indication to the master node 1, to indicate arrival of the downlink data of the terminal to the master node. Optionally, the paging request indication carries data forwarding address request information, used to request another base station to provide a data forwarding address. For example, the data forwarding address request information may include at least one of a quantity of data forwarding addresses, information about a radio bearer for data forwarding, information about a PDU session for data forwarding, and information about a QoS flow for data forwarding. In this case, the master node 1 sends a paging message on an Xn interface to another base station (for example, the master node 2), so that the another base station sends a paging message over an air interface of the another base station, to enable the UE to request state transition from the third mode to the connected mode. Optionally, the paging message on the Xn interface may further include the data forwarding address request information, to request the another base station to provide a data forwarding address. Optionally, the data forwarding address request information may be provided by the secondary node, or may be generated by the master node based on the downlink data that is of the terminal and that is received by the master node from the core network. Correspondingly, after the terminal sends the first message to the master node 2 in S804, a context request message sent by the master node 2 to the master node 1 may carry a data forwarding address (for example, a downlink Xn-interface user plane address) allocated to the terminal. The master node 2 compares a terminal identifier 1 in a paging message on an interface with a terminal identifier 2 in the first message, to determine whether two terminals are the same. Optionally, the data forwarding address provided by the master node 2 may be allocated to the terminal by the master node 2, or may be requested by the master node 2 from a secondary node 2 and allocated to the terminal by the secondary node 2. Optionally, if the paging request indication sent by the secondary node 1 to the master node 1 includes the data forwarding address request information, the master node 1 sends the data forwarding address received from the master node 2 to the secondary node 1, so that the secondary node 1 forwards data to the master node 2/the secondary node 2 based on the address.

Operation S804. The terminal sends the first message to the master node 2, to request state transition of the terminal from the third mode to the connected mode.

In an embodiment, the terminal in the third mode performs cell reselection in a movement process, and camps on a selected first cell. In this way, the terminal needs to send the first message to the master node 2 (an access network device to which the first cell belongs). The first message is specifically used to request to resume an RRC connection of the terminal or request to update a location area (for example, an RNAU or a TAU) of the terminal.

For example, the first message may be a message 3 (MSG3) in a random access procedure, and the MSG3 may be an RRC connection resume request or an RRC resume request.

In an embodiment, the first message includes the terminal identifier 2 and a security check parameter.

The terminal identifier 2 may be the same as the terminal identifier 1, or may be a part of the terminal identifier 1. For the terminal identifier 1, refer to the foregoing descriptions in S800. Details are not described herein again.

The security check parameter is used by the master node 2 to verify validity of the terminal. Specifically, the terminal derives the security check parameter based on a current MN security key. In an optional implementation, after deriving, based on the second security parameter, the first MN base key for communicating with the master node 2, the terminal derives, based on the first MN base key, the first MN security key for communicating with the master node 2, and uses the first MN security key as the current MN security key. In another optional implementation, the terminal uses, as the current MN security key, the initial MN security key used for communication with the master node 1. For example, the integrity protection key used for RRC signaling is used as the current MN security key.

In an embodiment, the first message further includes first information, and the first information is used by the master node 2 to determine a secondary node that serves the terminal.

In an embodiment, the first information in this application is obtained by the terminal in the third mode by performing measurement based on a measurement configuration. The measurement configuration includes at least one of or any combination of the following information: information about a measured secondary node, information about a measured cell, a measurement quantity, a preset frequency, and a preset rule.

The information about the measured secondary node is used to indicate a base station that needs to be measured by the terminal, and may include a base station identifier and/or an index value corresponding to the base station. The information about the measured cell is used to indicate the base station that needs to be measured by the terminal. The measured cell may be a cell provided by the measured secondary node or any cell for which a base station to which the cell belongs is not distinguished, and may include a cell identifier and/or an index value corresponding to the cell. The measurement quantity is used to indicate an attribute of a signal that needs to be measured by the terminal or a specific measurement value that needs to be obtained. For example, the measurement quantity may be an RRC measurement value (layer 3 measurement value) or a media access control (MAC) measurement value (layer 2 measurement value), may be reference signal received power (RSRP), may be reference signal received quality (RSRQ), or may be a beam-related measurement value. The preset frequency is used to indicate the terminal to measure a cell on the frequency. The preset rule is used to indicate the terminal to evaluate, according to the rule, a cell or a base station that satisfies the rule. For example, the preset rule is that signal quality of a cell is higher than a preset threshold.

A possible embodiment in which the terminal obtains the measurement configuration is as follows: The terminal receives, by using UE-specific signaling, the measurement configuration sent by the master node 1, where the UE-specific signaling may be an RRC connection release message or an RRC release message. For example, the terminal receives an RRC connection release message that is sent by the master node 1 and that carries the measurement configuration and the state transition indication information.

Another possible embodiment in which the terminal obtains the measurement configuration is as follows: The terminal obtains the measurement configuration by reading a system broadcast message.

It should be noted that, in a same cell, if the terminal can obtain the measurement configuration by using both dedicated signaling and a system broadcast message, the terminal obtains the measurement configuration by using the dedicated signaling.

Another possible embodiment in which the terminal obtains the measurement configuration is as follows: When the terminal in the third mode moves to a new cell and obtains a measurement configuration from the new cell, the terminal discards the previously obtained measurement configuration, and uses the measurement configuration obtained from the new cell.

In an embodiment, the first information includes channel quality of each of at least one measurement cell, the first information is used to indicate that the secondary node that serves the terminal is the secondary node 1, the first information is used to indicate that the secondary node that serves the terminal is the secondary node 1 and indicate a cell that is of the first secondary node and that satisfies a preset condition, or the first information is used to indicate that the secondary node that serves the terminal is the secondary node 2.

When the first information includes the channel quality of each of the at least one measurement cell, the "channel quality of each of the at least one measurement cell" may be an RRC layer measurement result or a MAC layer measurement result.

When the "channel quality of each of the at least one measurement cell" is an RRC layer measurement result, the "channel quality of each of the at least one measurement cell" is carried in an RRC message.

When "channel quality of the at least one measurement cell" is a MAC layer measurement result, the MAC layer measurement result may be a channel quality indicator (CQI) measurement result.

In an embodiment of this application, the channel quality of each of the at least one measurement cell is measured by the terminal before the terminal sends the first message. In other words, when the channel quality of each measurement cell is measured, the terminal in this embodiment of this application is in the third mode.

In an embodiment, the measurement cell may be a master cell of the secondary node 1, may be a cell on a preset frequency, or may be a cell specified by a base station (for example, the secondary node 1). This is not specifically limited in the embodiments of this application. For example, if a serving cell of a terminal in the connected mode includes a plurality of cells of the secondary node 1, that is, a secondary cell group includes a master cell and at least one secondary cell, the terminal considers that the measurement cell is a master cell, and the secondary cell is deactivated. If the measurement cell is a cell (for example, a master cell or a secondary cell of the secondary node 1) specified by a base station, another unspecified cell (for example, a serving cell of the secondary node 1) of the secondary node 1 is considered to be deactivated.

When the "channel quality of each of the at least one measurement cell" is the MAC layer measurement result, the measurement cell needs to provide a to-be-measured signal for the terminal. For example, if the measurement cell is a master cell of the secondary node 1, the master cell of the secondary node 1 may continuously provide dedicated measurement signals for the terminal.

In an embodiment, after determining the channel quality of each of the at least one measurement cell, the terminal may compare the channel quality of each measurement cell with a preset threshold, and determine a site to which a measurement cell whose channel quality is greater than the preset threshold belongs as the secondary node that serves the terminal, and sends a determining result to the master node 2. That is, the first information may be used to indicate that the secondary node that serves the terminal is the secondary node 1, or used to indicate that the secondary node that serves the terminal is the secondary node 2. In this case, the first information may be a site index, may be a site identifier, or may be other information used to uniquely identify a site. This is not specifically limited in the embodiments of this application.

Further, after determining the secondary node that serves the terminal, the terminal may further determine a cell that is of the secondary node and that satisfies a preset condition. The preset condition herein may be a condition received by the terminal from the secondary node 1, or may be preset by a system. In this way, the first information may be used to indicate the secondary node that serves the terminal and the cell that is of the secondary node and that satisfies the preset condition.

If the first information is used to indicate the secondary node that serves the terminal and the cell, satisfying the preset condition, of the secondary node, the first information may include a cell identifier or a cell index list. A cell index value in the cell index list may be allocated by a base station to which the cell belongs. For example, when the secondary node that serves the terminal is the secondary node 1, the first information is specifically used to indicate that the secondary node that serves the terminal is the secondary node 1 and indicate the cell, satisfying the preset condition, of the secondary node 1.

In an embodiment, the first information may include only information about the cell, satisfying the preset condition, of the secondary node that serves the terminal. In this way, the first information may implicitly indicate the secondary node that serves the terminal.

It is easy to understand that the secondary node that serves the terminal may be the secondary node 1 or the secondary node 2. When the secondary node that serves the terminal is the secondary node 2, the measurement cell in this embodiment of this application includes a part of cells of the secondary node 1 and a part of cells in the secondary node 2.

In an embodiment, the first information may be alternatively used to indicate that the secondary node that serves the terminal is not the secondary node 1 and indicate channel quality of each of at least one measurement cell. In this way, after receiving the first information, the master node 1 may determine, based on the first information, the secondary node that serves the terminal.

When the first information is used to indicate that the secondary node that serves the terminal is not the secondary node 1 and the channel quality of each of the at least one measurement cell, the first information may be carried in the first message. Alternatively, a part (for example, information used to indicate that the secondary node that serves the terminal is not the secondary node 1) of the first information may be carried in the first message, and the other (for example, the channel quality of each of the at least one measurement cell) of the first information is carried in a message 7. For a case in which a part of the first information is carried in the first message, and the other part of the first information is carried in the message 7, refer to the following descriptions in FIG. 10A to FIG. 10C. Details are not described herein again.

In an embodiment, the first message may alternatively not carry the first information. When the first message does not carry the first information, after the terminal sends the first message to the master node 2, the master node 2 determines whether to accept a request of the terminal, and sends, to the terminal after determining to accept the request of the terminal, a message used to indicate that a connection between the master node 2 and the terminal is successfully resumed. Subsequently, the terminal sends the first information to the master node 2.

Operation S805. The master node 2 determines the secondary node that serves the terminal.

When the first message includes the first information, and the first information includes the channel quality of each of the at least one measurement cell, the first information is used to indicate that the secondary node that serves the terminal is the secondary node 1, the first information is used to indicate that the secondary node that serves the terminal is the secondary node 1 and indicate the cell that is of the secondary node 1 and that satisfies the preset condition, or the first information is used to indicate that the secondary node that serves the terminal is the secondary node 2, the master node 2 determines, based on the first information, the secondary node that serves the terminal.

In an embodiment, when the first information includes a base station index or a cell index, the master node 2 further needs to obtain a correspondence between an index value and a base station identifier. If the master node 1 configures the correspondence between the index value and the base station identifier, the master node 1 needs to send the correspondence to the master node 2. Specifically, when sending a terminal context to the master node 2, the master node 1 further sends the correspondence.

When the first message includes only first information used to indicate whether the secondary node that serves the terminal is the secondary node 1, and the channel quality of each of the at least one measurement cell is carried in the message 7, the master node 2 determines, based on the channel quality of each of the at least one measurement cell in the message 7, the secondary node that serves the terminal. For details of this case, refer to the following descriptions in FIG. 10A to FIG. 10C.

When the first message does not carry the first information, after sending, to the terminal, the message used to indicate that the connection between the master node 2 and the terminal is successfully resumed, the master node 2 receives the first information sent by the terminal, and determines, based on the first information, the secondary node that serves the terminal. For details of this case, refer to the following descriptions in FIG. 11A and FIG. 11B. Details are not described herein again.

Operation S806. The master node 2 obtains a first security parameter.

The first security parameter is used to derive a security key used for communication between the terminal and the secondary node that serves the terminal.

In an embodiment, after determining the secondary node that serves the terminal, the master node 2 may determine the first security parameter, or may obtain the first security parameter from the terminal context.

When the master node 2 does not store the terminal context, the master node 2 sends a context request message to the master node 1 to obtain the terminal context, and then the master node 2 obtains the first security parameter from the terminal context. In this scenario, the master node 1 needs to determine the first security parameter and store the first security parameter in the terminal context. The master node 1 may alternatively send the first security parameter to the terminal by using the message 1, so that the terminal stores the first security parameter.

Operation S807. The master node 2 obtains SCG configuration information.

The SCG configuration information includes at least one of a random access resource allocated to the terminal by the secondary node that serves the terminal, information about a serving cell set of the secondary node that serves the terminal, and indication information of a master cell of the secondary node that serves the terminal.

Specifically, the master node 2 obtains the terminal context, and obtains the SCG configuration information based on the terminal context.

The terminal context includes at least one of radio access capability information (for example, UE-Radio Access Capability Info) of the terminal, the security context of the terminal, RRC configuration information (for example, including AS-Config) of the terminal, a radio management control configuration (for example, RRM-Config) of the terminal, the random access resource allocated to the terminal by the secondary node 1, the terminal identifier 1, the configuration information 2, and the first terminal identifier of the terminal. The first terminal identifier is used by the secondary node 1 to identify the terminal.

Herein, the security context of the terminal includes at least one of the initial MN base key, the initial SN base key, the initial MN security key, the initial MN security algorithm, the initial SN security key, the initial SN security algorithm, the NH, the NCC, the SN security parameter, the first security parameter, the first MN base key, the first MN security key, and the second security parameter.

In an embodiment, the first terminal identifier may be an interface identifier allocated to the terminal by the secondary node 1 on the interface between the secondary node 1 and the master node 1, for example, a UE XnAP ID on a secondary node 1 side.

In an embodiment, if the master node 2 is the master node 1, and the master node 2 stores the terminal context, the master node 2 obtains the SCG configuration information based on the terminal context. Optionally, if the master node 1 has sent the terminal context to the master node 2, the master node 2 directly obtains the SCG configuration information based on the terminal context that is stored on the master node 2. If the master node 2 does not store the terminal context, the master node 2 sends a context request message to a device that stores the terminal context, to obtain the terminal context.

This embodiment of this application is described by using an example in which the master node 2 does not store the terminal context and the device that stores the terminal context is the master node 1. Specifically, the master node 2 sends, to the master node 1, a context request message used to request the terminal context. Correspondingly, the master node 2 receives the terminal context from the master node 1. Herein, the first MN base key included in the terminal context is derived by the master node 1 based on the second security parameter. Optionally, the master node 1 may derive the first MN base key after receiving the context request message. In this case, the context request message may further include a cell identifier and frequency information of the master node 2, so that the master node 1 derives the first MN base key. Optionally, the master node 1 may alternatively derive and store the first MN base key before receiving the context request message. In this case, the first MN base key is irrelevant to a cell identifier and frequency information.

When the terminal context includes the first terminal identifier and the secondary node that serves the terminal is the secondary node 1, after obtaining the terminal context, the master node 2 sends a message 2 including the first terminal identifier to the secondary node 1, to request the secondary node 1 to allocate the SCG configuration information. After receiving the message 2, the secondary node 1 determines the SCG configuration information (for example, the random access resource allocated to the terminal by the secondary node 2, the determined information about the serving cell set, the master cell, and the like), and then the secondary node 1 sends the SCG configuration information to the master node 2.

Because the first terminal identifier may be a terminal identifier of an interface between sites, when the first terminal identifier is a unique identifier of the interface, to enable the secondary node 1 to identify the terminal based on the first terminal identifier, the secondary node 1 further needs to learn of an identifier of a peer site corresponding to the first terminal identifier, for example, an identifier of the master node 1. For example, when the first terminal identifier is the UE XnAP ID on the secondary node 1 side, the secondary node 1 may identify the terminal based on the identifier of the master node 1 and the UE XnAP ID on the secondary node 1 side.

When the terminal context includes the configuration information 2 and the secondary node that serves the terminal is the secondary node 2, the master node 2 obtains the first SN base key based on the first security parameter and the first MN base key. The master node 2 sends a message 3 including the configuration information 2 to the secondary node 2, to request the secondary node 2 to allocate the SCG configuration information. Optionally, the message 3 may further include a first SN base key. After receiving the message 3, the secondary node 2 determines the SCG configuration information (for example, the random access resource allocated to the terminal by the secondary node 2, the determined information about the serving cell set, the master cell, and the like) based on the configuration information 2, and then the secondary node 2 sends the SCG configuration information to the master node 2. In an embodiment, the secondary node 2 may determine the SCG configuration information based on at least one of the following information in the configuration information 2: information used for capability negotiation, information used for measurement configuration negotiation, information carried on an SN, configuration information carried on the SN, and the SCG configuration information. Optionally, the SCG configuration information includes any one of or any combination of the following information: a cell radio network temporary identifier (C-RNTI) allocated to the terminal by a secondary node, a random access resource allocated to the terminal by the secondary node, information about a serving cell set provided by the secondary node for the terminal, and a master cell provided by the secondary node for the terminal. Optionally, the secondary node 2 applies the PDCP state of the SN in the configuration information 2. For example, when data on the SN bearer is subsequently transmitted for the terminal, a sequence number in the PDCP state is still used. In this way, it can be ensured that after the terminal resumes data transmission, data packets carried on the SN may still be transmitted in sequence.

In an embodiment, the message 3 further includes at least one of a first SN base key, a security capability of the terminal, the initial SN security algorithm, and an identifier (for example, MN UE XnAP ID) allocated to the terminal by the master node 2 on an interface between the master node 2 and the secondary node 2. The security capability of the terminal and the initial SN security algorithm may be used by the secondary node 2 to configure the first SN security algorithm for the terminal. For example, the secondary node 2 selects the first SN security algorithm for the terminal based on the security capability of the terminal and a security algorithm configuration of the secondary node 2, and notifies the terminal of the first SN security algorithm. Optionally, when the first SN security algorithm selected by the secondary node 2 for the terminal is the same as the initial SN security algorithm of the terminal, the secondary node 2 does not need to send an indication to the terminal. In this case, the terminal uses the initial SN security algorithm in the current security context as the first SN security algorithm by default. When the first SN security algorithm selected by the secondary node 2 for the terminal is different from the initial SN security algorithm, the secondary node 2 includes the first SN security algorithm in the SCG configuration information, and the master node 2 sends the SCG configuration information to the terminal. In other words, the first SN security algorithm may be explicitly or implicitly indicated. For example, if the SCG configuration information does not explicitly indicate the first SN security algorithm, it indicates that the first SN security algorithm is the same as the initial SN security algorithm.

Operation S808. The master node 2 sends a second message including the first security parameter and the SCG configuration information to the terminal.

In an embodiment, the master node 2 obtains the first MN security algorithm used for communicating with the terminal, and obtains the first MN security key based on the first MN base key and the first MN security algorithm. In this way, the master node 2 may perform security protection on the second message by using the first MN security key.

In an embodiment, the master node 2 may determine the first MN security algorithm by itself, or may determine the initial MN security algorithm as the first MN security algorithm. This is not specifically limited in the embodiments of this application.

In an embodiment, the second message further includes the first MN security algorithm and/or the second security parameter, so that the terminal derives the first MN base key and/or the first MN security key.

With reference to the foregoing descriptions, it can be learned that if the master node 2 directly determines, based on the first information in the first message, the secondary node that serves the terminal, the second message may be used to indicate that the connection between the master node 2 and the terminal is successfully resumed. In this case, the second message is a fourth message (MSG4) in a random access process. For example, the MSG4 is an RRC connection resume message, an RRC resume message, an RRC reconfiguration message, an RRC connection reconfiguration message, or the like. If the first information is not carried in the first message, the second message may be an RRC reconfiguration message or an RRC connection reconfiguration message.

Operation S809. After receiving the second message, the terminal completes, based on the first security parameter and the SCG configuration information, a communication connection to the secondary node that serves the terminal.

In an embodiment, the terminal derives a first SN base key based on the received first security parameter and first MN base key. In this way, the terminal can derive the first SN security key based on the first SN base key and the first SN security algorithm. The terminal can quickly establish, based on the first SN security key and the SCG configuration information, the communication connection to the secondary node that serves the terminal.

In an embodiment, if the second message further includes the second security parameter (for example, the second security parameter is an NCC), the terminal derives the first MN base key based on the second security parameter. For example, the terminal derives the first MN base key based on the received NCC and the NH stored in the terminal.

In an embodiment, some/all information in the SCG configuration information may be the same as some/all information in the configuration information 1. In this way, efficiency of establishing, by the terminal, the communication connection to the secondary node that serves the terminal is further improved.

In conclusion, in this application, the terminal can obtain both the first security parameter and the SCG configuration information. In this way, the terminal can directly complete, based on the first security parameter and the SCG configuration information, the communication connection to the secondary node that serves the terminal. This effectively improves a rate of configuring an SCG when the terminal resumes from the third mode to the connected mode, and further improves efficiency of transmitting data by the terminal through an air interface of the secondary node.

In addition, in an embodiment of this application, alternatively, after obtaining the first security parameter, the master node 2 may directly send the first security parameter to the terminal (that is, the first security parameter and the SCG configuration information are carried in different messages), so that when the terminal subsequently communicates with the secondary node that serves the terminal, communication data is protected by using the parameter.

For ease of description, this embodiment of this application is described by using an example in which both the first security parameter and the SCG configuration information are carried in the second message.

It can be learned from the foregoing descriptions that in this embodiment of this application, the first information may be carried only in the first message or the message 7; or a part of the first information is carried in the first message, and the remaining part is carried in the message 7. The following separately describes each case.

Figure 9A:
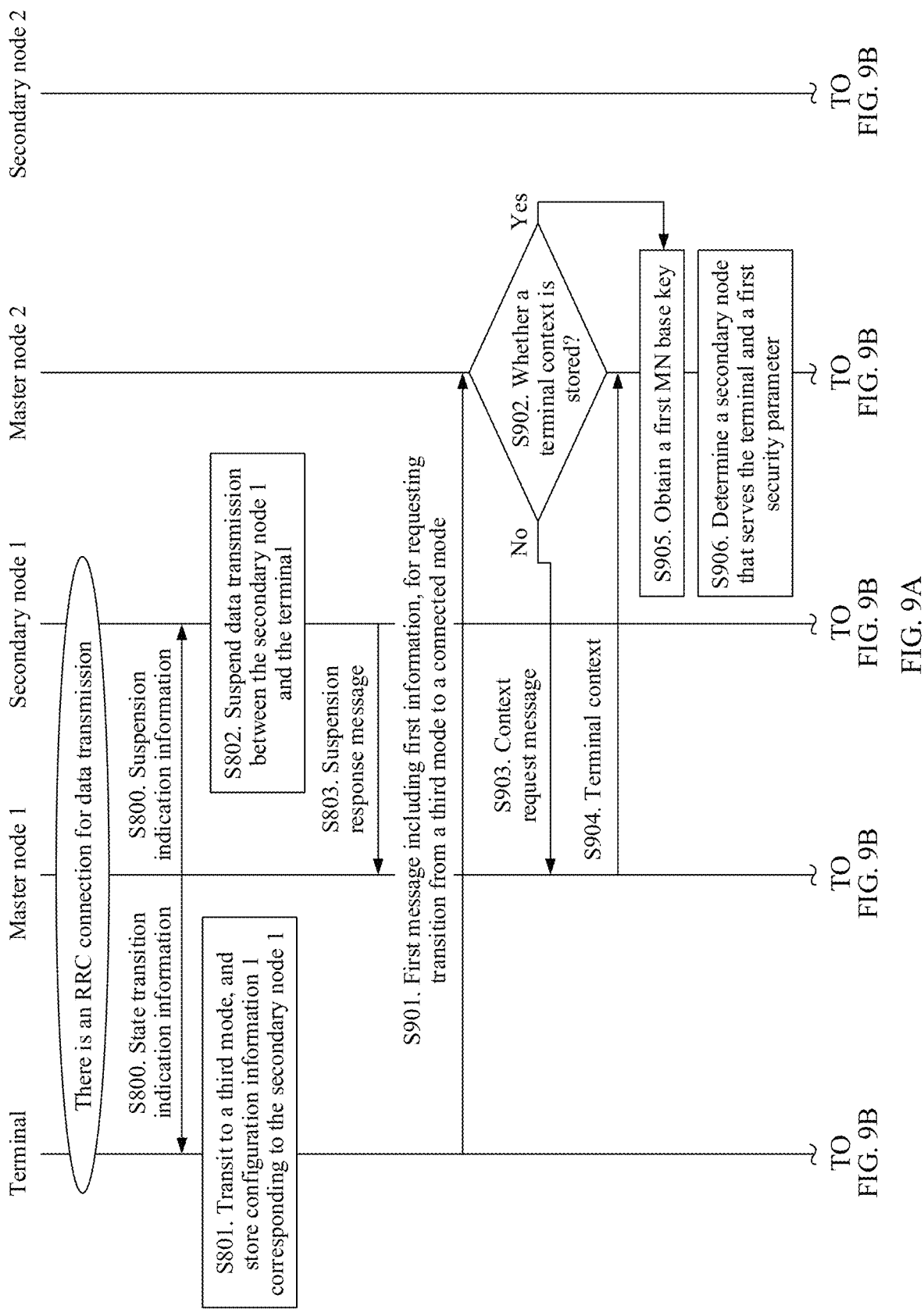
FIG. 9A and FIG. 9B are a schematic flowchart 2 of a communication method according to an embodiment of this application.
Figure 9B:
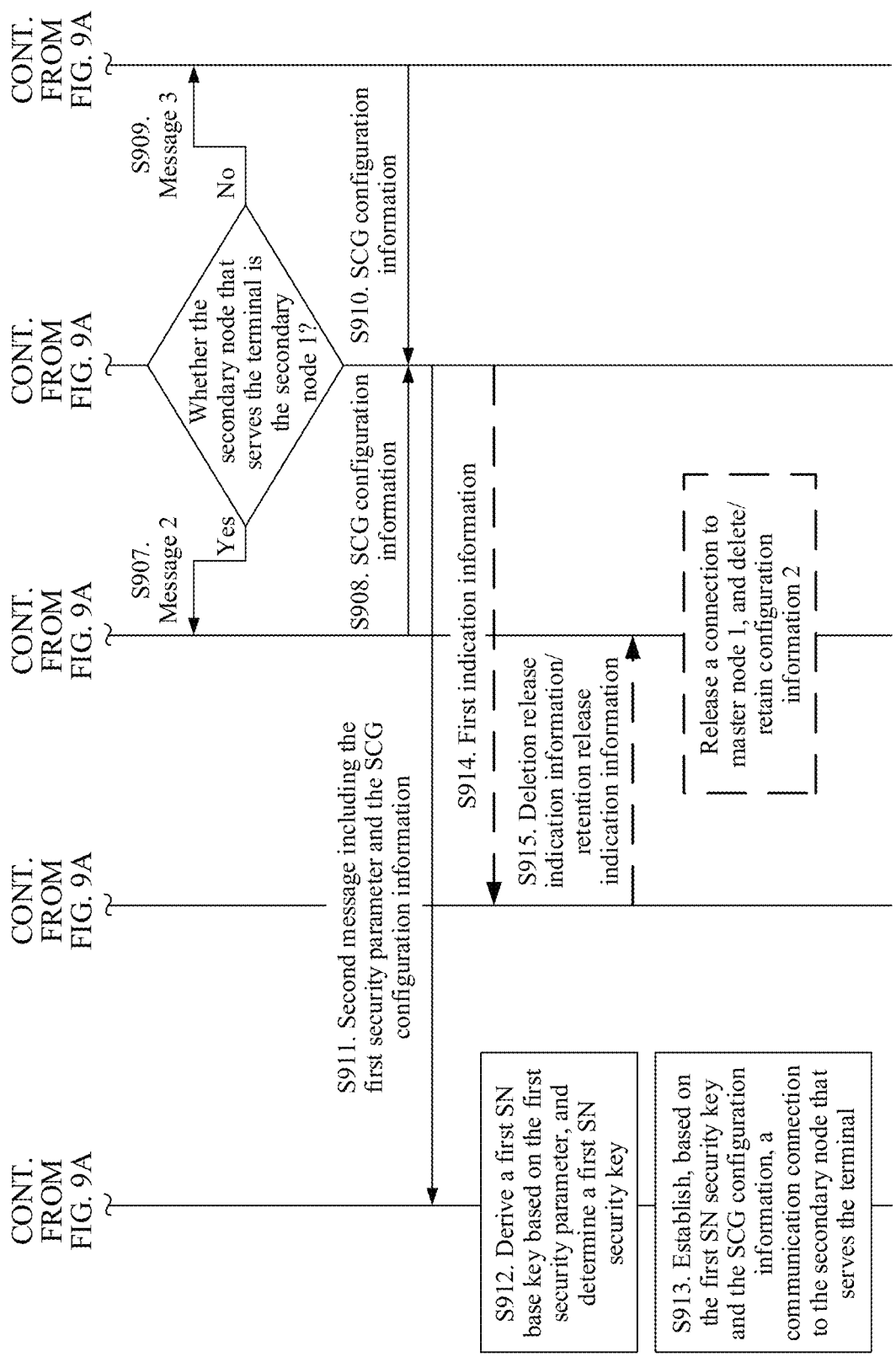

With reference to FIG. 8A and FIG. 8B, when the first information is carried in the first message, and the master node 2 determines, based on the first information in the first message, the secondary node that serves the terminal, FIG. 9A and FIG. 9B show a procedure of a communication method provided by this application.

As shown in FIG. 9A and FIG. 9B, the communication method includes operations S800 to S803 and S901 to S915. For operations S800 to S803, refer to the foregoing descriptions. Details are not described herein again. The following describes operations S901 to S915.

Operation S901. The terminal sends the first message including first information to the master node 2, to request state transition of the terminal from the third mode to the connected mode.

For a description of the first information, refer to operation S804. Details are not described herein again.

Operation S902. The master node 2 determines whether the master node 2 stores the terminal context.

In response to the first message, the master node 2 needs to determine, based on the terminal context, whether to accept the request of the terminal.

In an embodiment, if the master node 2 stores the terminal context, and a result of checking the terminal by the master node 2 is that the check succeeds, the master node 2 accepts the request of the terminal. Subsequently, the master node 2 determines whether the secondary node that serves the terminal changes, that is, the master node 2 sequentially performs operation S905. If the master node 2 does not store the terminal context, the master node 2 sends a context request message to the master node 1, to obtain the terminal context, that is, operation S903 is sequentially performed.

Operation S903. The master node 2 sends the context request message to the master node 1, to request the terminal context.

The master node 2 identifies, based on the terminal identifier 2 in the first message, a site that stores the terminal context. For example, the site that stores the terminal context is the master node 1. In an embodiment, the master node 2 sends the context request message to the master node 1, to request the terminal context. The context request message may include the terminal identifier 2 used by the master node 1 to identify the terminal and a security check parameter used by the master node 1 to check the terminal.

Operation S904. The master node 1 sends the terminal context to the master node 2.

In an embodiment, the master node 1 checks the terminal based on the security check parameter in the context request message. If the check succeeds, the master node 1 sends the terminal context to the master node 2. For descriptions of the terminal context, refer to the descriptions of the terminal context in S807. Details are not described herein again.

Operation S905. The master node 2 obtains a first MN base key.

In an embodiment, the master node 2 may obtain the first MN base key from the terminal context, that is, the master node 1 derives the first MN base key, and sends the first MN base key to the master node 2. Alternatively, the master node 2 may obtain an NH and the second security parameter from the core network, and derive the first MN base key.

Operation S906. The master node 2 determines, based on the first information, a secondary node that serves the terminal, and obtains a first security parameter.

After determining the secondary node that serves the terminal, the master node 2 obtains the first security parameter related to the site.

In an implementation, if the secondary node that serves the terminal is the secondary node 1, the master node 2 may obtain the first security parameter from the terminal context. If the secondary node that serves the terminal is the secondary node 2, the master node 2 determines the first security parameter by itself.

In another embodiment, either when the secondary node that serves the terminal is the secondary node 1 or when the secondary node that serves the terminal is the secondary node 2, the master node 2 determines the first security parameter by itself. This reduces a delay in determining, by the master node 2, the secondary node that serves the terminal.

In an embodiment, in the scenario in which the secondary node 1 retains the configuration information 2 in operation S803, the master node 2 can determine, based on the terminal context, that the secondary node 1 is the secondary node that serves the terminal before the terminal enters the third mode. After the master node 2 determines, based on the first information, the secondary node that serves the terminal, the master node 2 determines whether the secondary node that serves the terminal is the secondary node 1. If the secondary node that serves the terminal is the secondary node 1, the master node 2 sequentially performs operations S907 and S908. If the secondary node that serves the terminal is the secondary node 2, the master node 2 performs operation S909.

In an embodiment, when the secondary node 1 deletes the terminal context, releases the dedicated resource allocated to the terminal by the secondary node 1 on the interface between the secondary node 1 and the master node 1, and releases the dedicated resource allocated to the terminal by the secondary node 1 on the interface between the secondary node 1 and the 5GC in S803, the master node 2 does not need to determine whether the secondary node that serves the terminal is the secondary node 1, and the master node 2 sequentially performs operation S909.

In an embodiment of this application, the master node 2 may first perform operation S903, and then perform operation S906, or may first perform operation S906, and then perform operation S903, or may simultaneously perform operations S903 and S906. This is not specifically limited in this embodiment of this application.

Operation S907. The master node 2 sends a message 2 to the secondary node 1.

The message 2 includes at least one of a first terminal identifier and the configuration information 2.

In an embodiment, the message 2 may further include at least one of an identifier of the master node 1 and the terminal identifier 1. In this way, the secondary node 2 may obtain the terminal context based on the information in the message 2.

Operation S908. The secondary node 1 sends SCG configuration information to the terminal.

For the SCG configuration information, refer to the descriptions in operation S807.

After operation S908 is performed, S911 is sequentially performed for the communication method provided by an embodiment of this application.

Operation S909. The master node 2 sends a message 3 including the configuration information 2 to the secondary node 2.

When the master node 2 determines that the secondary node that serves the terminal is the secondary node 2, operations S909 and S910 are sequentially performed after operation S906.

In an embodiment, the message 3 may further include at least one of a first SN base key, a security capability of the terminal, the initial SN security algorithm, and an identifier allocated to the terminal by the master node 2 on an interface between the master node 2 and the secondary node 2.

When the first message includes channel quality of each of at least one measurement cell, the message 3 may further include the channel quality of each of the at least one measurement cell. Likewise, when the first message includes information about a cell that satisfies a preset condition, the message 3 may further include the information about the cell.

Operation S910. The secondary node 2 sends the SCG configuration information to the master node 2.

In an embodiment, the SCG configuration information is carried in a message 5.

After operation S910 is performed, operation S911 is sequentially performed for the communication method provided by this embodiment of this application.

Operation S911. The master node 2 sends a second message including the first security parameter and the SCG configuration information to the terminal.

Operation S912. The terminal derives a first SN base key based on the first security parameter, and determines a first SN security key based on the first SN base key.

Operation S913. The terminal establishes, based on the first SN security key and the SCG configuration information, a communication connection to the secondary node that serves the terminal.

In an embodiment, when the secondary node that serves the terminal is the secondary node 1, the terminal establishes the communication connection to the secondary node 1 based on the first SN security key and the SCG configuration information. When the secondary node that serves the terminal is the secondary node 2, the terminal establishes the communication connection to the secondary node 2 based on the first SN security key and the SCG configuration information.

In an embodiment, the communication method provided by this embodiment of this application may further include operations S914 and S915.

Operation S914 (Optional). The master node 2 sends first indication information to the master node 1.

The first indication information is used to indicate that the secondary node that serves the terminal is the secondary node 1, or the first indication information is used to indicate that the secondary node that serves the terminal is not the secondary node 1.

In an embodiment, the first indication information may be represented by using a preset value (for example, 1-bit information), or may be an identifier of the secondary node or an index of the secondary node. This is not specifically limited in the embodiments of this application.

If the master node 2 has determined, before sending the context request message, the secondary node that serves the terminal, the first indication information may be carried in the context request message.

Operation S915 (Optional). The master node 1 sends deletion release indication information/retention release indication information to the secondary node 1.

In an embodiment, when the first indication information indicates that the secondary node that serves the terminal is not the secondary node 1, the master node 1 sends the deletion release indication information to the secondary node 1, so that the secondary node 1 deletes the terminal context, releases the dedicated resource allocated to the UE by the secondary node 1 on the interface between the secondary node 1 and the master node 1, and releases the dedicated resource allocated to the UE by the secondary node 1 on the interface between the secondary node 1 and the 5GC. When the secondary node that serves the terminal is the secondary node 1, the master node 1 sends the retention release indication information to the secondary node 1, so that the secondary node 1 retains the terminal context and releases the dedicated resource allocated to the UE on the interface between the secondary node 1 and the master node 1. In this way, a resource occupation rate can be effectively reduced.

Operations S914 and S915 are optional, and therefore are represented by dashed lines in FIG. 9A and FIG. 9B.

It can be learned that the master node 2 in the embodiment shown in FIG. 9A and FIG. 9B can directly determine, based on the first information in the first message, the secondary node that serves the terminal, and send both the SCG configuration information and the first security parameter to the terminal, so that the terminal can quickly resume the communication connection to the secondary node that serves the terminal.

Figure 10A:
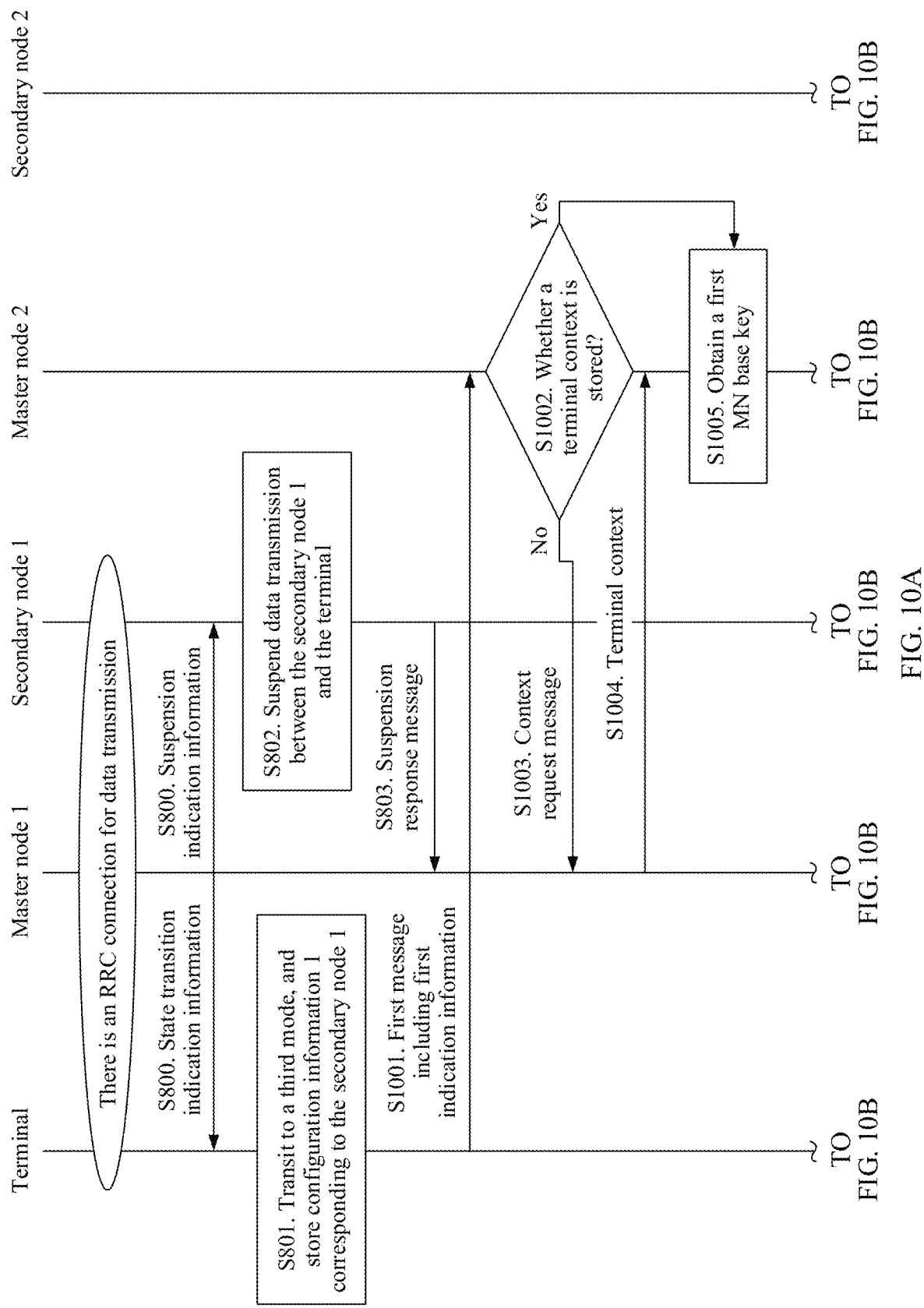
Figure 10B:
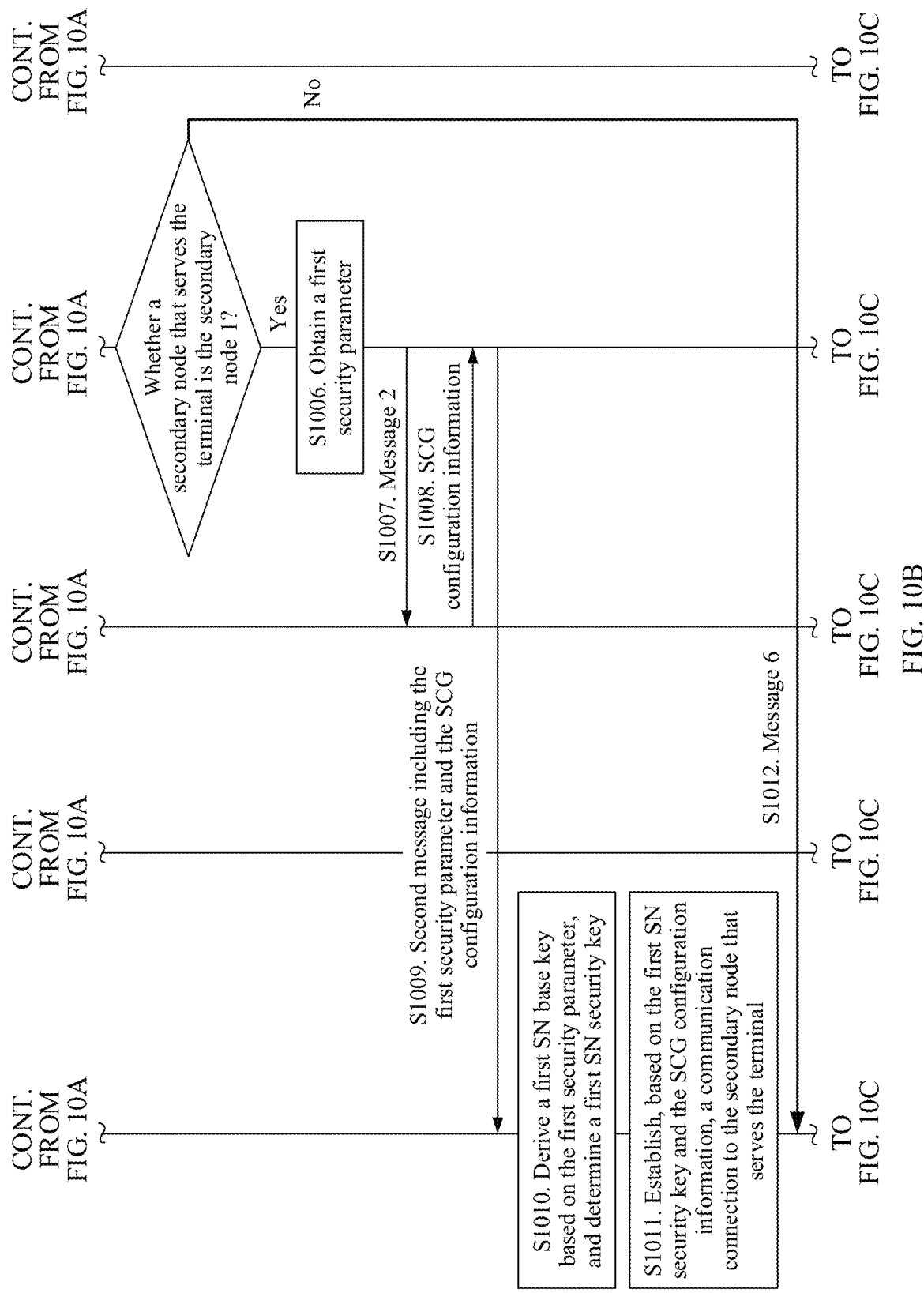

When the first message carries the first indication information used to indicate whether the secondary node that serves the terminal is the secondary node 1, and the message 7 carries the channel quality of each of the at least one measurement cell, FIG. 10A to FIG. 10C show a procedure of a communication method provided by this application.

It should be specially noted that, the method is particularly applicable to a scenario in which the secondary node 1 retains the terminal context, that is, the secondary node 1 retains the terminal context, retains the dedicated resource allocated to the UE by the secondary node 1 on the interface between the secondary node 1 and the master node 1, and retains the dedicated resource allocated to the UE by the secondary node 1 on the interface between the secondary node 1 and the 5GC in operation S803.

With reference to FIG. 9A and FIG. 9B, as shown in FIG. 10A to FIG. 10C, the communication method includes operations S800 to S803 and S1001 to S1018. For operations S800 to S803, refer to the foregoing descriptions. Details are not described herein again. The following describes operations S1001 to S1018.

Operation S1001. The terminal sends the first message including first indication information to the master node 2, to request state transition of the terminal from the third mode to the connected mode.

The first indication information is used to indicate whether a secondary node that serves the terminal is the secondary node 1.

When the terminal is in the third mode, the terminal may measure channel quality of each of at least one measurement cell, and determine, based on a measurement result, whether the secondary node that serves the terminal is the secondary node 1, that is, determine the first indication information based on the measurement result. For descriptions of the measurement cell, refer to the descriptions of the measurement cell in S804. Details are not described herein again.

Operation S1002. The master node 2 determines whether the master node 2 stores the terminal context.

For operation S1002, refer to operation S902. If the master node 2 stores the terminal context, and a result of checking the terminal by the master node 2 is that the check succeeds, the master node 2 accepts the request of the terminal. Subsequently, the master node 2 determines whether the secondary node that serves the terminal changes, that is, the master node 2 sequentially performs operation S1005. If the master node 2 does not store the terminal context, the master node 2 sends a context request message to the master node 1, to obtain the terminal context, that is, operation S1003 is sequentially performed.

Operation S1003. The master node 2 sends the context request message to the master node 1, to request the terminal context.

When the master node 2 does not store the terminal context, the master node 2 sends the context request message to the master node 1. For S1003, refer to S903. Details are not described again herein.

Operation S1004. The master node 1 sends the terminal context to the master node 2.

For operation S1004, refer to operation S904. Details are not described again herein.

Operation S1005. The master node 2 obtains a first MN base key.

For details of operation S1005, refer to operation S905.

If the first indication information is used to indicate that the secondary node that serves the terminal is the secondary node 1, operations S1006 to S1011 are sequentially performed.

If the first indication information is used to indicate that the secondary node that serves the terminal is not the secondary node 1, operations S1012 to S1016 are sequentially performed.

Operation S1006. The master node 2 obtains a first security parameter from the terminal context.

Operation S1007. The master node 2 sends a message 2 to the secondary node 1.

For operation S1007, refer to operation S907. Details are not described again herein.

Operation S1008. The secondary node 1 sends SCG configuration information to the terminal.

For operation S1008, refer to operation S908. Details are not described again herein.

Operation S1009. The master node 2 sends a second message including the first security parameter and the SCG configuration information to the terminal.

Operation S1010. The terminal derives a first SN base key based on the first security parameter, and determines a first SN security key based on the first SN base key.

Operation S1011. The terminal establishes, based on the first SN security key and the SCG configuration information, a communication connection to the secondary node that serves the terminal.

Operation S1012. The master node 2 sends a message 6 to the terminal.

The message 6 is used to indicate that a connection between the terminal and the master node 2 is successfully resumed. In this case, the message 6 may be an RRC resume message, may be an RRC connection resume message, may be an RRC reconfiguration message, or may be an RRC connection reconfiguration message.

In an embodiment, the message 6 is further used to instruct the terminal to report auxiliary information used to select a new secondary node.

Operation S1013. The terminal sends a message 7 including the channel quality of each of the at least one measurement cell to the master node 2.

For example, the message 7 may be used to indicate that the terminal has resumed the connection to the master node 2. In this case, the message 7 may be an RRC resume complete message, may be an RRC connection resume complete message, may be an RRC reconfiguration complete (message, or may be an RRC connection reconfiguration complete message. In addition, the message 7 may be a message used to report the measurement result, for example, a measurement report message.

In an embodiment, the channel quality of each of the at least one measurement cell is measured when the terminal is in the third mode. This effectively reduces a rate of resuming, by the terminal, a connection to the secondary node. For descriptions of the measurement cell, refer to the descriptions of the measurement cell in S804. Details are not described herein again.

Operation S1014. The master node 2 determines, based on the channel quality of each of the at least one measurement cell, the secondary node that serves the terminal.

Herein, an example in which the secondary node 2 is the secondary node that serves the terminal is used for description. After determining the secondary node 2, the master node 2 determines a first security parameter.

Operation S1015. The master node 2 sends a message 3 including the configuration information 2 to the secondary node 2.

For operation S1015, refer to the description about operation S909. Details are not described again herein.

Operation S1016. The secondary node 2 sends the SCG configuration information to the master node 2.

For operation S1016, refer to the description about operation S910. Details are not described again herein.

After operations S1016, S1009 to S1011 are sequentially performed.

In an embodiment, the communication method provided by this embodiment of this application may further include operations S1017 and S1018.

Operation S1017 (Optional). The master node 2 sends the first indication information to the master node 1.

For operation S1017, refer to the description about operation S914. Details are not described again herein.

Operation S1018 (Optional). The master node 1 sends deletion release indication information/retention release indication information to the secondary node 1.

In an embodiment, when the first indication information indicates that the secondary node that serves the terminal is not the secondary node 1, the master node 1 sends the deletion release indication information to the secondary node 1, so that the secondary node 1 deletes the configuration information 2 and releases a connection between the secondary node 1 and the master node 1.

When the secondary node that serves the terminal is the secondary node 1, the master node 1 sends the retention release indication message to the secondary node 1, so that the secondary node 1 retains the configuration information 2 and releases a connection between the secondary node 1 and the master node 1. In this way, a resource occupation rate can be effectively reduced.

Operations S1017 and S1018 are optional, and therefore are represented by dashed lines in FIG. 10A to FIG. 10C.

It can be learned that in the embodiment shown in FIG. 10A to FIG. 10C, the terminal in the third mode measures the channel quality of each measurement cell. In this way, when the master node 2 needs to obtain the channel quality of each of at least one measurement cell, the terminal can directly send the channel quality of each measurement cell to the master node 2, thereby improving a rate of resuming the communication connection between the terminal and the secondary node that serves the terminal.

Figure 11B:
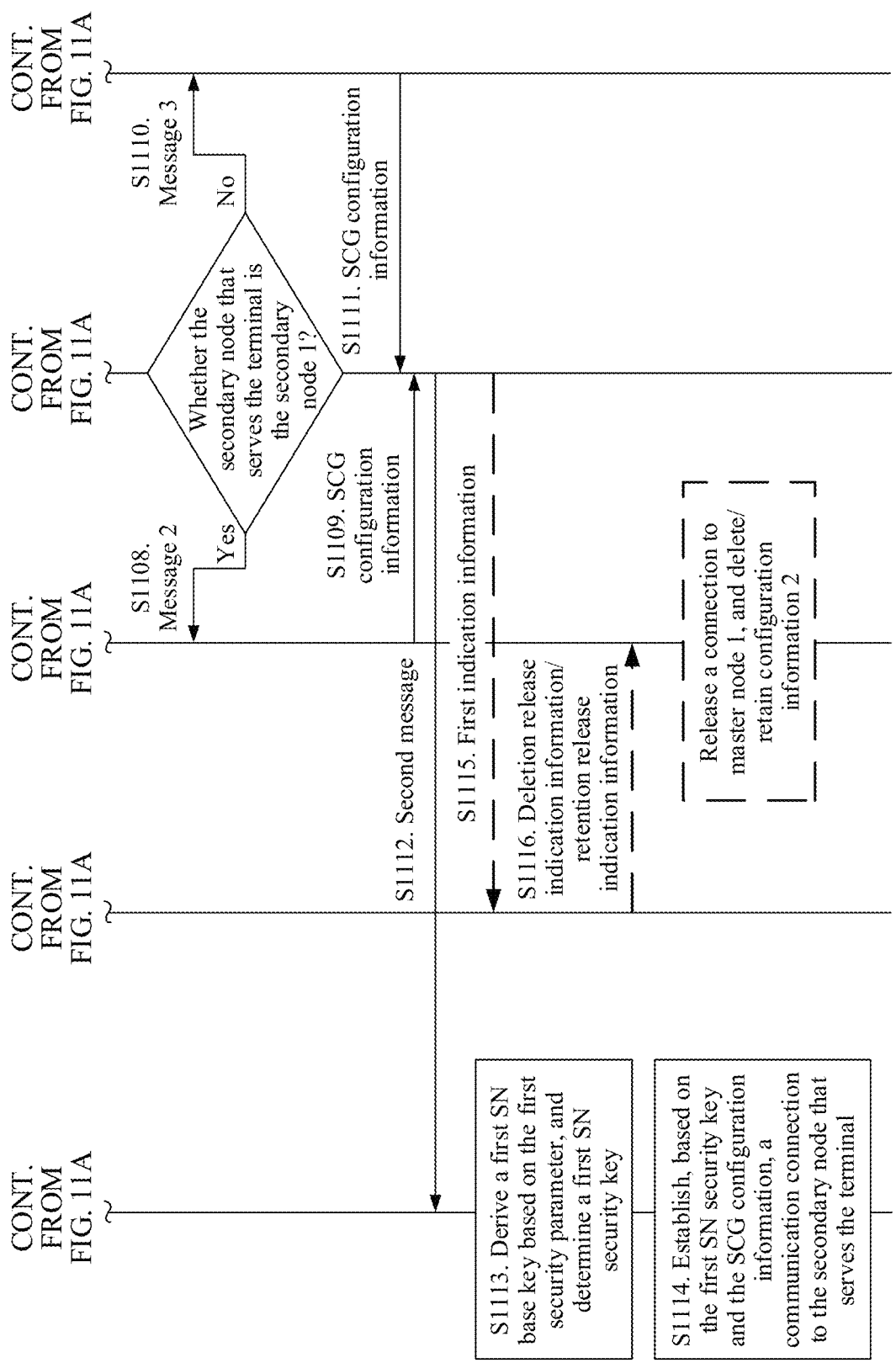

When the first message does not carry the first information, FIG. 11A and FIG. 11B show a procedure of a communication method provided by this application.

With reference to FIG. 9A and FIG. 9B, as shown in FIG. 11A and FIG. 11B, the communication method includes operations S800 to S803 and S1101 to S1116. For operations S800 to S803, refer to the foregoing descriptions. Details are not described herein again. The following describes S1101 to S1116.

Operation S1101. The terminal sends the first message that does not include the first information to the master node 2, to request state transition of the terminal from the third mode to the connected mode.

Operation S1102. The master node 2 determines whether the master node 2 stores the terminal context.

For operation S1102, refer to operation S902. If the master node 2 stores the terminal context, and a result of checking the terminal by the master node 2 is that the check succeeds, the master node 2 accepts the request of the terminal, and sends a message 6 to the terminal, that is, the master node 2 sequentially performs S1105. If the master node 2 does not store the terminal context, the master node 2 sends a context request message to the master node 1, to obtain the terminal context, that is, S1103 is sequentially performed.

Operation S1103. The master node 2 sends the context request message to the master node 1, to request the terminal context.

For operation S1103, refer to operation S903. Details are not described again herein.

Operation S1104. The master node 1 sends the terminal context to the master node 2.

For operation S1104, refer to operation S904. Details are not described again herein.

Operation S1105. The master node 2 sends the message 6 to the terminal.

After determining to accept the request of the terminal, the master node 2 sends the message 6 to the terminal. The message 6 is used to indicate that a connection between the terminal and the master node 2 is resumed. In this case, the message 6 may be an RRC resume message, may be an RRC connection resume message, may be an RRC reconfiguration message, or may be an RRC connection reconfiguration message.

In an embodiment, the message 6 is further used to instruct the terminal to report the first information used to select a new secondary node.

Operation S1106. The terminal sends a message 7 including the first information to the master node 2.

For example, the message 7 may be used to indicate that the terminal has resumed the connection to the master node 2. In this case, the message 7 may be an RRC resume complete message, may be an RRC connection resume complete message, may be an RRC reconfiguration complete message, or may be an RRC connection reconfiguration complete message. In addition, the message 7 may be a message used to report the measurement result, for example, a measurement report message.

Optionally, the first information herein is determined when the terminal is in the third mode. The message 7 is similar to the first message in S901. Details are not described herein again.

Operation S1107. The master node 2 determines, based on the first information, a secondary node that serves the terminal, and obtains a first security parameter.

For operation S1107, refer to operation S906. Details are not described again herein.

If the secondary node that serves the terminal is the secondary node 1, the master node 2 sequentially performs operations S1108 and S1109. If the secondary node that serves the terminal is the secondary node 2, the master node 2 performs S1110 and S1111.

Operation S1108. The master node 2 sends a message 2 to the secondary node 1.

For operation S1108, refer to operation S907. Details are not described again herein.

Operation S1109. The secondary node 1 sends SCG configuration information to the terminal.

For operation S1109, refer to operation S908. Details are not described again herein.

After operation S1109 is performed, S1112 is sequentially performed for the communication method provided by this embodiment of this application.

Operation S1110. The master node 2 sends a message 3 including the configuration information 2 to the secondary node 2.

For operation S1110, refer to operation S909. Details are not described again herein.

Operation S1111. The secondary node 2 sends the SCG configuration information to the master node 2.

For operation S1111, refer to S910. Details are not described again herein.

After operation S1111 is performed, S1112 is sequentially performed for the communication method provided by this embodiment of this application.

Operation S1112. The master node 2 sends a second message including the first security parameter and the SCG configuration information to the terminal.

For operation S1112, refer to operation S911. Details are not described again herein.

Operation S1113. The terminal derives a first SN base key based on the first security parameter, and determines a first SN security key based on the first SN base key.

For operation S1113, refer to operation S912. Details are not described again herein.

Operation S1114. The terminal establishes, based on the first SN security key and the SCG configuration information, a communication connection to the secondary node that serves the terminal.

For operation S1114, refer to operation S913. Details are not described again herein.

In an embodiment, the communication method provided by this embodiment of this application may further include operations S1115 and S1116.

Operation S1115 (Optional). The master node 2 sends the first indication information to the master node 1.

For operation S1115, refer to operation S914. Details are not described again herein.

Operation S1116 (Optional). The master node 1 sends deletion release indication information/retention release indication information to the secondary node 1.

For operation S1116, refer to operation S915. Details are not described again herein.

Operations S1115 and S1116 are optional, and therefore are represented by dashed lines in FIG. 11A and FIG. 11B.

It can be learned that, in the embodiment shown in FIG. 11A and FIG. 11B, the terminal determines the first information when the terminal is in the third mode, and the master node 2 can directly determine, based on the first information in the message 7, the secondary node that serves the terminal, and send both the SCG configuration information and the first security parameter to the terminal, so that the terminal can quickly resume the communication connection to the secondary node that serves the terminal.

In addition to the foregoing descriptions, in an embodiment of this application, after receiving a suspension indication information, the secondary node 1 may further send the configuration information 2 to the master node 1, and delete the configuration information 2 stored in the secondary node 1. In this way, the secondary node 1 does not need to maintain the configuration information 2. In this case, processing performed by another device in the communication method provided by this embodiment of this application is similar to the foregoing descriptions, and is not described herein again.

It should be noted that the communication methods in FIG. 8A and FIG. 8B, FIG. 9A and FIG. 9B, and FIG. 10A to FIG. 10C are also applicable to a case of location area update (for example, RAN Network Area Update, RANU) of the terminal. To be specific, the first message sent by the terminal is specifically used to request to update a location area (for example, RNAU) of the terminal. In this case, the master node 2 does not need to select the secondary node that serves the terminal, and the terminal does not need to provide the first information either. Therefore, operations S805 to S809, S905 to S913, S1005 to S1016, and S1107 to S1114 do not need to be performed. Optionally, when the secondary node 1 retains the terminal context, retains the dedicated resource allocated to the terminal by the secondary node 1 on the interface between the secondary node 1 and the master node 1, and retains the dedicated resource allocated to the UE by the secondary node 1 on the interface between the secondary node 1 and the 5GC, if the first indication information sent by the master node 2 to the master node 1 is used to indicate to request to update the location area of the terminal (for example, carrying a cause value of the RNAU), the master node 1 sends the deletion release indication information to the secondary node 1, to indicate the secondary node 1 to: delete the terminal context, release the dedicated resource allocated to the UE by the secondary node 1 on the interface between the secondary node 1 and the master node 1, and release the dedicated resource allocated to the UE by the secondary node 1 on the interface between the secondary node 1 and the 5GC. In an embodiment, the first indication information may be carried in the context request message. If the security check on the master node 1 succeeds, the master node 1 sends the deletion release indication information to the secondary node 1. In an embodiment, when the master node 2 allows the terminal to perform location area update, the master node 2 sends a path switch request to the core network, where the request carries a packet data unit (PDU) session (session) identifier of an SN bearer, a dedicated resource (for example, a downlink NG-interface user plane address) allocated to the UE by the master node 2 on an interface between the master node 2 and the 5GC, so that the 5GC replaces the dedicated resource (for example, a downlink NG-interface user plane address) allocated to the UE by the secondary node 1 on the interface between the secondary node 1 and the 5GC with the dedicated resource allocated to the UE by the master node 2 on an interface between the master node 2 and the 5GC, where the dedicated resource allocated to the UE by the secondary node 1 on the interface between the secondary node 1 and the 5GC is stored by the 5GC and corresponds to the SN bearer. It should be noted that, a path update method for the location area update may be used as an independent method, or may be used in combination with other operations in this embodiment of this application. This is not limited in this application.

An embodiment of this application provides a communications apparatus 12. The communications apparatus 12 may be a base station, for example, an eLTE eNB or a gNB, or may be a part of a base station, for example, a chip system in the base station. In an embodiment, the chip system is configured to support the base station in implementing a function in the foregoing method embodiments, for example, receiving, sending, or processing data and/or information in the foregoing methods. The chip system includes a chip, and may further include another discrete device or circuit structure.

The communications apparatus 12 is configured to perform an operation performed by the master node 1, the master node 2, the secondary node 1, or the secondary node 2 in the foregoing communication methods. The communications apparatus 12 provided in this embodiment of this application may include modules corresponding to corresponding operations.

In an embodiment of this application, the communications apparatus 12 may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, division into the modules is an example, and is merely logical function division. In an actual implementation, another division manner may be used.

Figure 12:
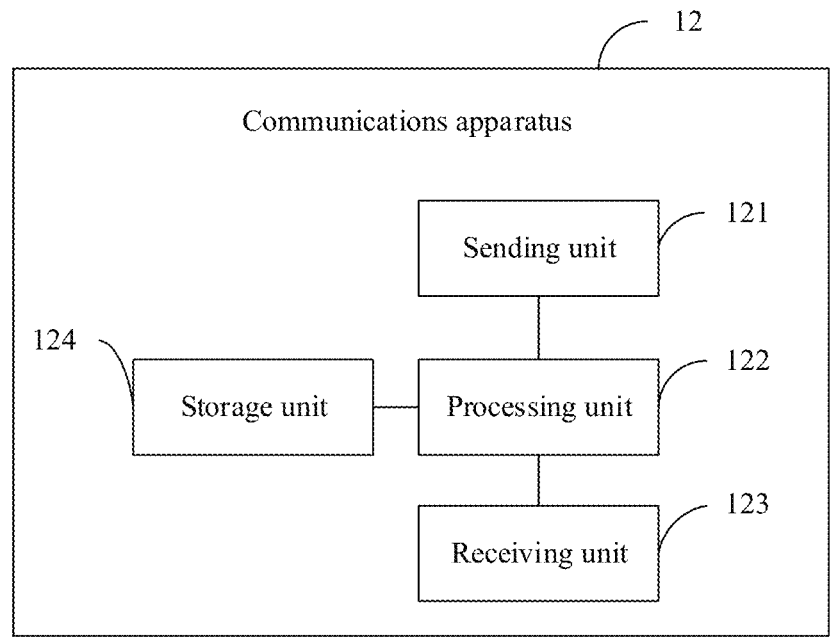
FIG. 12 is a schematic flowchart 1 of a communications apparatus according to an embodiment of this application.

When each function module corresponding to each function is obtained through division, FIG. 12 is a possible schematic structural diagram of the communications apparatus 12. As shown in FIG. 12, the communications apparatus 12 includes a sending unit 121, a processing unit 122, and a receiving unit 123. The sending unit 121 is configured to support the communications apparatus 12 in performing sending operations shown in FIG. 8A to FIG. 11B, for example, operations S800, S803, S808, S903, S904, S907, S908, S909, S910, S911, S915, S1003, S1004, S1007, S1008, S1009, S1012, S1015, S1016, S1017, S1018, S1103, S11104, S1105, S1108, S1109, S1110, S1111, S1112, S1115, and S1116, and/or is configured to perform another process of the technology described in this specification. The processing unit 122 is configured to support the communications apparatus 12 in performing processing operations shown in FIG. 8A to FIG. 11B, for example, operations S802, S805, S806, S807, S902, S905, S906, S1002, S1005, S1006, S1014, S1102, and S1107, and/or is configured to perform another process of the technology described in this specification. The receiving unit 123 is configured to support the communications apparatus 12 in performing receiving operations shown in FIG. 8A to FIG. 11B, for example, operations S803, S903, S904, S907, S908, S909, S910, S915, S1003, S1004, S1007, S1008, S1013, S1015, S1016, S1017, S1018, S1101, S1103, S11104, S1108, S1109, S1110, S1111, S1115, and S1116, and/or is configured to perform another process of the technology described in this specification. Certainly, the communications apparatus 12 provided by this embodiment of this application includes but is not limited to the foregoing modules. For example, the communications apparatus 12 may further include a storage unit 124. The storage unit 124 may be configured to store program code of the communications apparatus 12. All related content of the operations in the foregoing method embodiments may be cited in function descriptions of a corresponding function module, and details are not described herein again.

When the communications apparatus 12 is a base station, the processing unit 122 may be the processor 61 in FIG. 6, the sending unit 121 and the receiving unit 123 may be the transceiver 64 in FIG. 6, and the storage unit 124 may be the memory 62 in FIG. 6.

Another embodiment of this application further provides a computer-readable storage medium. The computer-readable storage medium stores an instruction. When the instruction is run on the communications apparatus 12, the communications apparatus 12 performs an operation performed by the master node 1 in the communication methods in the embodiments shown in FIG. 8A to FIG. 11B, an operation performed by the master node 2 in the communication methods in the embodiments shown in FIG. 8A to FIG. 11B, an operation performed by the secondary node 1 in the communication methods in the embodiments shown in FIG. 8A to FIG. 11B, or an operation performed by the secondary node 2 in the communication methods in the embodiments shown in FIG. 8A to FIG. 11B.

Another embodiment of this application further provides a computer program product. The computer program product includes a computer executable instruction, and the computer executable instruction is stored in a computer-readable storage medium. A processor of the communications apparatus 12 may read the computer executable instruction from the computer-readable storage medium, and the processor executes the computer executable instruction, so that the communications apparatus 12 performs an operation performed by the master node 1 in the communication methods in the embodiments shown in FIG. 8A to FIG. 11B, an operation performed by the master node 2 in the communication methods in the embodiments shown in FIG. 8A to FIG. 11B, an operation performed by the secondary node 1 in the communication methods in the embodiments shown in FIG. 8A to FIG. 11B, or an operation performed by the secondary node 2 in the communication methods in the embodiments shown in FIG. 8A to FIG. 11B.

An embodiment of this application provides a communications apparatus 13. The communications apparatus 13 may be a terminal, or may be a part of a terminal, for example, a chip system in the terminal. Optionally, the chip system is configured to support the terminal in implementing a function in the foregoing method embodiments, for example, receiving, sending, or processing data and/or information in the foregoing methods. The chip system includes a chip, and may further include another discrete device or circuit structure.

The communications apparatus 13 is configured to perform an operation performed by the terminal in the foregoing communication methods. The communications apparatus 13 provided in this embodiment of this application may include modules corresponding to corresponding operations.

In an embodiment of this application, the communications apparatus 13 may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, division into the modules is an example, and is merely logical function division. In an actual implementation, another division manner may be used.

Figure 13:
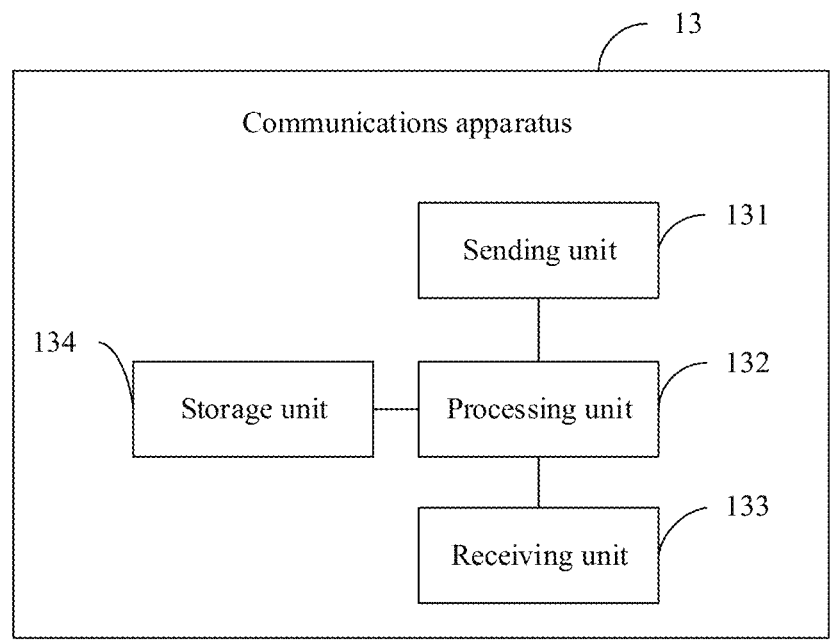
FIG. 13 is a schematic flowchart 2 of a communications apparatus according to an embodiment of this application.

When each function module corresponding to each function is obtained through division, FIG. 13 is a possible schematic structural diagram of the communications apparatus in this embodiment. As shown in FIG. 13, the communications apparatus 13 includes a sending unit 131, a processing unit 132, and a receiving unit 133. The sending unit 131 is configured to support the communications apparatus 13 in performing sending operations shown in FIG. 8A to FIG. 11B, for example, operations S804, S901, S1001, S1101, and S1106, and/or is configured to perform another process of the technology described in this specification. The processing unit 132 is configured to support the communications apparatus 13 in performing processing operations shown in FIG. 8A to FIG. 11B, for example, operations S801, S809, S912, S913, S1010, S1011, S1113, and S1114, and/or is configured to perform another process of the technology described in this specification. The receiving unit 133 is configured to support the communications apparatus 13 in performing receiving operations shown in FIG. 8A to FIG. 11B, for example, operations S800, S808, S911, S1009, S1012, S1105, and S1112, and/or is configured to perform another process of the technology described in this specification. All related content of the operations in the foregoing method embodiments may be cited in function descriptions of a corresponding function module, and details are not described herein again. Certainly, the communications apparatus 13 provided by this embodiment of this application includes but is not limited to the foregoing modules. For example, the communications apparatus 13 may further include a storage unit 134. The storage unit 134 may be configured to store program code and data of the communications apparatus 13.

For a block diagram of entities of the communications apparatus 13 provided by this application, refer to FIG. 7. When the communications apparatus 13 is a mobile phone, the processing unit 132 may be the processor 701 in FIG. 7, the sending unit 131 and the receiving unit 133 may be the antenna connected in the radio frequency circuit 702 in FIG. 7, and the storage unit 134 may be the memory 703 in FIG. 7.

Another embodiment of this application further provides a computer-readable storage medium. The computer-readable storage medium stores an instruction. When the instruction is run on the communications apparatus 13, the communications apparatus 13 performs an operation performed by the terminal in the communication methods in the embodiments shown in FIG. 8A to FIG. 11B.

Another embodiment of this application further provides a computer program product. The computer program product includes a computer executable instruction, and the computer executable instruction is stored in a computer-readable storage medium. A processor of the communications apparatus 13 may read the computer executable instruction from the computer-readable storage medium, and the processor executes the computer executable instruction, so that the communications apparatus 13 performs an operation performed by the terminal in the communication methods in the embodiments shown in FIG. 8A to FIG. 11B.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method applied for a terminal, comprising:
   sending a first message to a first master node to request state transition of the terminal from a third mode to a connected mode, wherein the first master node is an access network device to which a first cell belongs, and the first cell is a cell in which a radio resource control (RRC) state of the terminal is the third mode and the terminal requests to resume an RRC connection;
   receiving a second message from the first master node, the second message comprising a first security parameter and secondary cell group (SCG) configuration information, wherein the first security parameter is used to derive a security key used for communication between the terminal and a secondary node that serves the terminal, and the SCG configuration information comprises at least one of a random access resource allocated to the terminal by the secondary node, information of a serving cell set of the secondary node, or indication information of a master cell of the secondary node; and
   completing, based on the first security parameter and the SCG configuration information, a communication connection to the secondary node.

2. The communication method according to claim 1, further comprising:
   receiving a state transition indication information from a second master node, wherein the state transition indication information is used to indicate the RRC state of the terminal to be transited from the connected mode to the third mode;
   transiting the RRC state of the terminal to the third mode in response to the state transition indication information; and
   storing first configuration information corresponding to a secondary node serves the terminal before the terminal transits to the third mode, wherein the first configuration information comprises at least one of configuration information of an SCG bearer or a Packet Data Convergence Protocol (PDCP) state of the SCG bearer.

3. The communication method according to claim 1, further comprising:
sending first information to the first master node for determining the secondary node that serves the terminal.

4. The communication method according to claim 3, wherein
the first information comprises channel quality of each of at least one measurement cell, or
the first information indicates that the secondary node that serves the terminal is a first secondary node, or
the first information indicates that the secondary node that serves the terminal is the first secondary node and indicates a cell of the first secondary node satisfying a preset condition, or
the first information indicates that the secondary node that serves the terminal is a second secondary node, or
the first information indicates that the secondary node that serves the terminal is not the first secondary node and indicates an identifier of a second secondary node, or
the first information indicates that the secondary node that serves the terminal is not the first secondary node and indicates channel quality of each of at least one measurement cell;
wherein the first secondary node serves the terminal before the terminal transits to the third mode, and the second secondary node serves the terminal after the terminal resumes to the connected mode.

5. The communication method according to claim 1, wherein the first message is used to request to resume a radio link control (RLC) connection of the terminal or to update a location area of the terminal, and
the second message is used to resume the RLC connection between the first master node and the terminal.

6. The communication method according to claim 1, wherein the secondary node is a secondary node that serves the terminal before the terminal transits to the third mode, or the secondary node is a second secondary node that serves the terminal after the terminal resumes to the connected mode.

7. A communications apparatus, comprising:
at least one processor; and
at least one memory storing instructions, which when executed by the at least one processor, cause a terminal to perform operations, the operations comprising:
sending a first message to a first master node to request state transition of the terminal from a third mode to a connected mode, wherein the first master node is an access network device to which a first cell belongs, and the first cell is a cell in which a radio resource control (RRC) state of the terminal is the third mode and the terminal requests to resume an RRC connection;
receiving a second message from the first master node, wherein the second message comprises a first security parameter and secondary cell group (SCG) configuration information, wherein the first security parameter is used to derive a security key used for communication between the terminal and a secondary node that serves the terminal, and the SCG configuration information comprises at least one of a random access resource allocated to the terminal by the secondary node, information of a serving cell set of the secondary node, or indication information of a master cell of the secondary node; and
completing, based on the first security parameter and the SCG configuration information, a communication connection to the secondary node.

8. The communications apparatus according to claim 7, wherein the operations further comprise:
receiving a state transition indication information from a second master node, wherein the state transition indication information is used to indicate the RRC state of the terminal to be transited from the connected mode to the third mode;
transiting the RRC state of the terminal to the third mode in response to the state transition indication information, and
storing first configuration information corresponding to a secondary node serves the terminal before the terminal transits to the third mode, wherein the first configuration information comprises at least one of configuration information of an SCG bearer and a Packet Data Convergence Protocol (PDCP) state of the SCG bearer.

9. The communications apparatus according to claim 7, wherein the operations further comprise:
sending first information to the first master node for determining the secondary node that serves the terminal.

10. The communications apparatus according to claim 9, wherein the first information comprises channel quality of each of at least one measurement cell, or
the first information indicates that the secondary node that serves the terminal is a first secondary node, or
the first information indicates that the secondary node that serves the terminal is the first secondary node and indicates a cell of the first secondary node satisfying a preset condition, or
the first information indicates that the secondary node that serves the terminal is a second secondary node, or
the first information indicates that the secondary node that serves the terminal is not the first secondary node and indicates an identifier of a second secondary node, or
the first information indicates that the secondary node that serves the terminal is not the first secondary node and indicates channel quality of each of at least one measurement cell;
wherein the first secondary node serves the terminal before the terminal transits to the third mode, and the second secondary node serves the terminal after the terminal resumes to the connected mode.

11. The communications apparatus according to claim 7, wherein the first message is used to request to resume a radio link control (RLC) connection of the terminal or to update a location area of the terminal; and
the second message is used to resume the RLC connection between the first master node and the terminal.

12. The communications apparatus according to claim 7, wherein the secondary node is a secondary node that serves the terminal before the terminal transits to the third mode, or the secondary node is a second secondary node that serves the terminal after the terminal resumes to the connected mode.

13. A communication system, comprising a first master node, and a secondary node, wherein
the first master node is configured to receive a first message from a terminal to request a state transition of the terminal from a third mode to a connected mode, determine the secondary node that serves the terminal, obtain a first security parameter and secondary cell group (SCG) configuration information, send a second message to the terminal, wherein the second message comprises the first security parameter and the SCG configuration information;

wherein the first security parameter is used to derive a security key used for communication between the terminal and a secondary node that serves the terminal, and the SCG configuration information comprises at least one of a random access resource allocated to the terminal by the secondary node, information of a serving cell set of the secondary node, or indication information of a master cell of the secondary node;

the secondary node is configured to connect with the terminal after the terminal completes a communication connection to the secondary node based on the first security parameter and the SCG configuration information.

14. The communication system according to claim 13, further comprising the terminal, wherein the terminal is configured to send the first message to the first master node, receive the second message from the first master node, and complete, based on the first security parameter and the SCG configuration information, a communication connection to the secondary node.

15. The communication system according to claim 13, wherein the first master node is configured to receive first information from the terminal, and determine, based on the first information, the secondary node that serves the terminal.

16. The communication system according to claim 15, wherein the first information comprises channel quality of each of at least one measurement cell, or the first information indicates that the secondary node that serves the terminal is a first secondary node, or the first information indicates that the secondary node that serves the terminal is a first secondary node and indicates a cell of the first secondary node and that satisfies a preset condition, or the first information indicates that the secondary node that serves the terminal is a second secondary node, or the first information indicates that the secondary node that serves the terminal is not a first secondary node and indicates an identifier of a second secondary node, or the first information indicates that the secondary node that serves the terminal is not a first secondary node and indicates the channel quality of each of at least one measurement cell, and wherein the first secondary node serves the terminal before the terminal transitions to the third mode, and the second secondary node serves the terminal after the terminal resumes to the connected mode.

17. The communication system according to claim 13, wherein the first message is used to request to resume a radio link control (RLC) connection of the terminal or to update a location area of the terminal; and the second message is used to resume the RLC connection between the first master node and the terminal.

18. The communication system according to claim 13, wherein the determined secondary node is a first secondary node that serves the terminal before the terminal transits to the third mode, and the first master node is configured to obtain a context of the terminal comprising a first terminal identifier allocated to the terminal by the first secondary node on an interface between the first secondary node and a second master node that serves the terminal before the terminal transitions to the third mode; send a third message comprising the first terminal identifier to the first secondary node, wherein the third message is used to request the first secondary node to allocate the SCG configuration information; and receive the SCG configuration information from the first secondary node.

19. The communication system according to claim 13, wherein the determined secondary node is a second secondary node that serves the terminal after the terminal resumes to the connected mode, and the first master node is configured to obtain a context of the terminal comprising first configuration information, wherein the first configuration information is the SCG configuration information allocated by a first secondary node that serves the terminal before the terminal transitions to the third mode; send a third message comprising the first configuration information to the second secondary node to request the second secondary node to allocate the SCG configuration information; and receive the SCG configuration information from the second secondary node.

20. The communication system according to claim 13, wherein the first master node is further configured to send first indication information to a second master node, wherein the first indication information is used to indicate that the secondary node that serves the terminal is a first secondary node, or the first indication information is used to indicate that the secondary node that serves the terminal is not the first secondary node, and wherein the second master node serves the terminal before the terminal transitions to the third mode.

* * * * *